United States Patent
Ochi et al.

(10) Patent No.: US 11,192,280 B2
(45) Date of Patent: Dec. 7, 2021

(54) COATING-LIQUID-IMPREGNATED FIBER-REINFORCED FABRIC, SHEET-SHAPED INTEGRATED OBJECT, PREPREG, PREPREG TAPE, AND METHOD FOR MANUFACTURING FIBER-REINFORCED COMPOSITE MATERIAL

(71) Applicant: Toray Industries, Inc., Tokyo (JP)

(72) Inventors: Takashi Ochi, Ehime (JP); So Nishino, Otsu (JP); Tamotsu Suzuki, Otsu (JP); Junichi Aoki, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/733,988

(22) PCT Filed: May 23, 2019

(86) PCT No.: PCT/JP2019/020471
§ 371 (c)(1),
(2) Date: Dec. 1, 2020

(87) PCT Pub. No.: WO2019/235237
PCT Pub. Date: Dec. 12, 2019

(65) Prior Publication Data
US 2021/0213649 A1    Jul. 15, 2021

(30) Foreign Application Priority Data
Jun. 5, 2018  (JP) .............................. JP2018-107418

(51) Int. Cl.
*B29B 15/12*  (2006.01)
*B29C 70/22*  (2006.01)
(Continued)

(52) U.S. Cl.
CPC ............ *B29B 15/125* (2013.01); *B29C 70/22* (2013.01); *B29C 70/30* (2013.01); *D06B 3/201* (2013.01); *D06B 5/08* (2013.01); *D10B 2505/02* (2013.01)

(58) Field of Classification Search
CPC ......... B29C 70/22; B29C 70/30; B29C 70/28; B29C 70/50; D06B 5/08; D06B 2505/02;
(Continued)

(56) References Cited

U.S. PATENT DOCUMENTS 3,941,550 A * 3/1976 Marion ............... B29C 48/0014
425/463
4,862,713 A   9/1989 Kutz et al.
(Continued)

FOREIGN PATENT DOCUMENTS

JP   01016612 A   1/1989
JP   01104624 A   4/1989
(Continued)

OTHER PUBLICATIONS

English Translation of Written Opinion for International Application No. PCT/JP2019/020471, dated Nov. 3, 2020, 5 pages.
(Continued)

*Primary Examiner* — Matthew J Daniels
*Assistant Examiner* — Gregory C. Grosso
(74) *Attorney, Agent, or Firm* — RatnerPrestia

(57) ABSTRACT

The present invention is a method of producing a coating liquid-impregnated reinforcing fiber fabric 1b, including allowing a reinforcing fiber fabric 1a to pass substantially vertically downward through the inside of a coating section 20 storing a coating liquid 2 to provide the reinforcing fiber fabric 1a with the coating liquid 2; wherein the coating section 20 includes a liquid pool and a narrowed section which are in communication with each other; wherein the
(Continued)

liquid pool has a portion whose cross-sectional area decreases continuously along a running direction of the reinforcing fiber fabric 1a, wherein the narrowed section has a slit-like cross-section and has a smaller cross-sectional area than the top side of the liquid pool, and wherein the vertical height of the portion whose cross-sectional area decreases continuously in the liquid pool is 10 mm or more.

12 Claims, 23 Drawing Sheets

(51) Int. Cl.
  *B29C 70/30* (2006.01)
  *D06B 3/20* (2006.01)
  *D06B 5/08* (2006.01)

(58) Field of Classification Search
  CPC ... D06B 5/04; D06B 5/00; D06B 5/06; D06B 5/02; D06B 3/201; D06B 3/20; B29B 15/12; B29B 15/122; B29B 15/10; B29B 15/125
  USPC ........................................................ 428/195.1
  See application file for complete search history.

(56) References Cited

U.S. PATENT DOCUMENTS

| | | | |
|---|---|---|---|
| 5,068,142 A * | 11/1991 | Nose | B29B 15/122 442/50 |
| 5,433,897 A * | 7/1995 | Kanome | B29C 43/222 264/1.33 |
| 5,529,652 A | 6/1996 | Asai et al. | |
| 9,434,811 B2 | 9/2016 | Arai et al. | |
| 10,239,970 B2 | 3/2019 | Asano et al. | |
| 2005/0202182 A1 | 9/2005 | Vossenkaul et al. | |
| 2012/0308817 A1 | 12/2012 | Ponsolle et al. | |
| 2013/0005855 A1 * | 1/2013 | Arai | C08L 63/00 523/427 |
| 2015/0272099 A1 * | 10/2015 | Oikawa | B29C 70/22 43/22 |
| 2015/0344649 A1 * | 12/2015 | Sequeira | C08G 59/4035 523/451 |
| 2016/0303777 A1 * | 10/2016 | Miyauchi | B29B 15/122 |
| 2019/0001571 A1 * | 1/2019 | Stockett | B33Y 30/00 |

FOREIGN PATENT DOCUMENTS

| | | |
|---|---|---|
| JP | 01124668 A | 5/1989 |
| JP | 01178412 A | 7/1989 |
| JP | 03222704 A | 10/1991 |
| JP | 3252278 B2 | 2/2002 |
| JP | 2011132389 A | 7/2011 |
| JP | 2011162619 A | 8/2011 |
| JP | 2013022868 A | 2/2013 |
| JP | 2014522332 A | 9/2014 |
| JP | 2016510077 A | 4/2016 |
| JP | 2016203397 A | 12/2016 |
| JP | 2017008111 A | 1/2017 |
| JP | 2017154330 A | 9/2017 |
| WO | 0128951 A2 | 4/2001 |
| WO | 2007127032 A2 | 11/2007 |
| WO | 2009142231 A1 | 11/2009 |
| WO | 2010093598 A2 | 8/2010 |
| WO | 2010150022 A1 | 12/2010 |
| WO | 2011075344 A1 | 6/2011 |
| WO | 2011118106 A1 | 9/2011 |
| WO | 2013086063 A3 | 6/2013 |
| WO | 2014088866 A1 | 6/2014 |
| WO | 2015060299 A1 | 4/2015 |
| WO | 2015076981 A1 | 5/2015 |
| WO | 2017068159 A1 | 4/2017 |
| WO | 2017095810 A1 | 6/2017 |
| WO | 2017112766 A1 | 6/2017 |

OTHER PUBLICATIONS

International Search Report and Written Opinion for International Application No. PCT/JP2019/020471, dated Aug. 27, 2019, 6 pages.

* cited by examiner

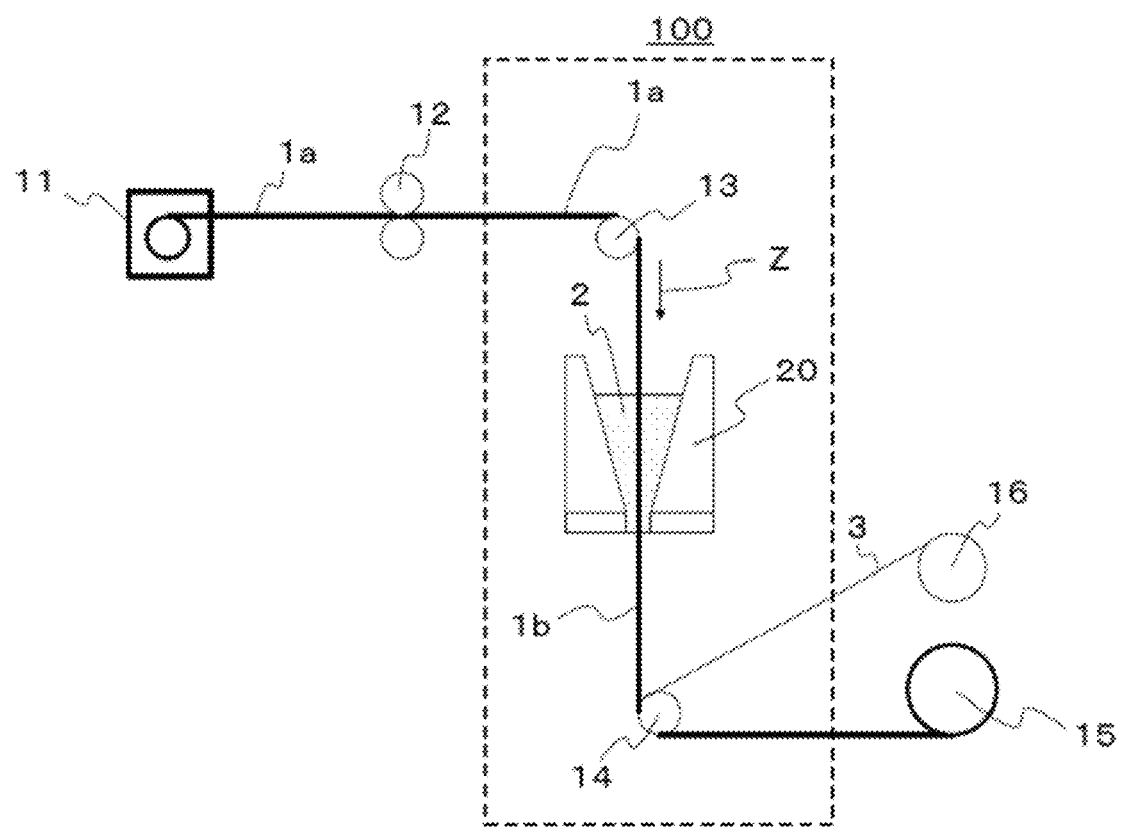

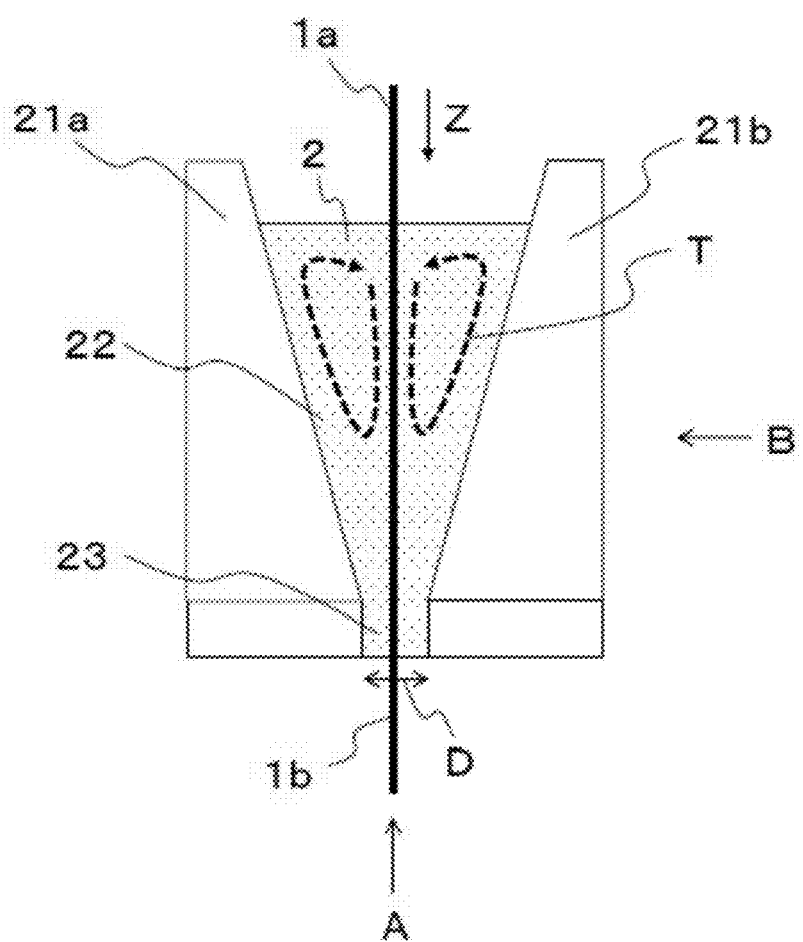

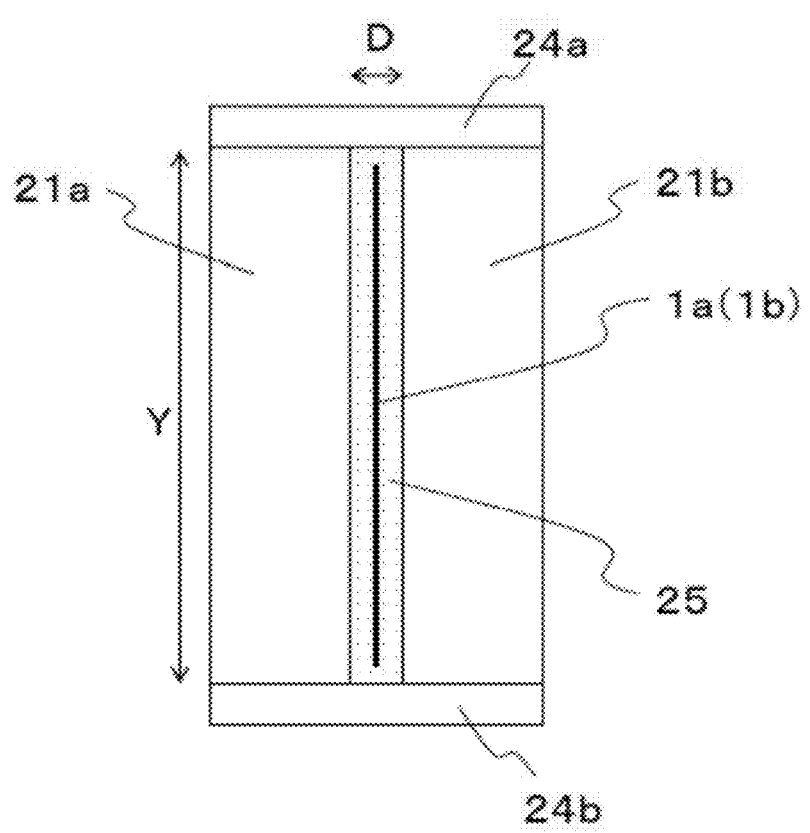

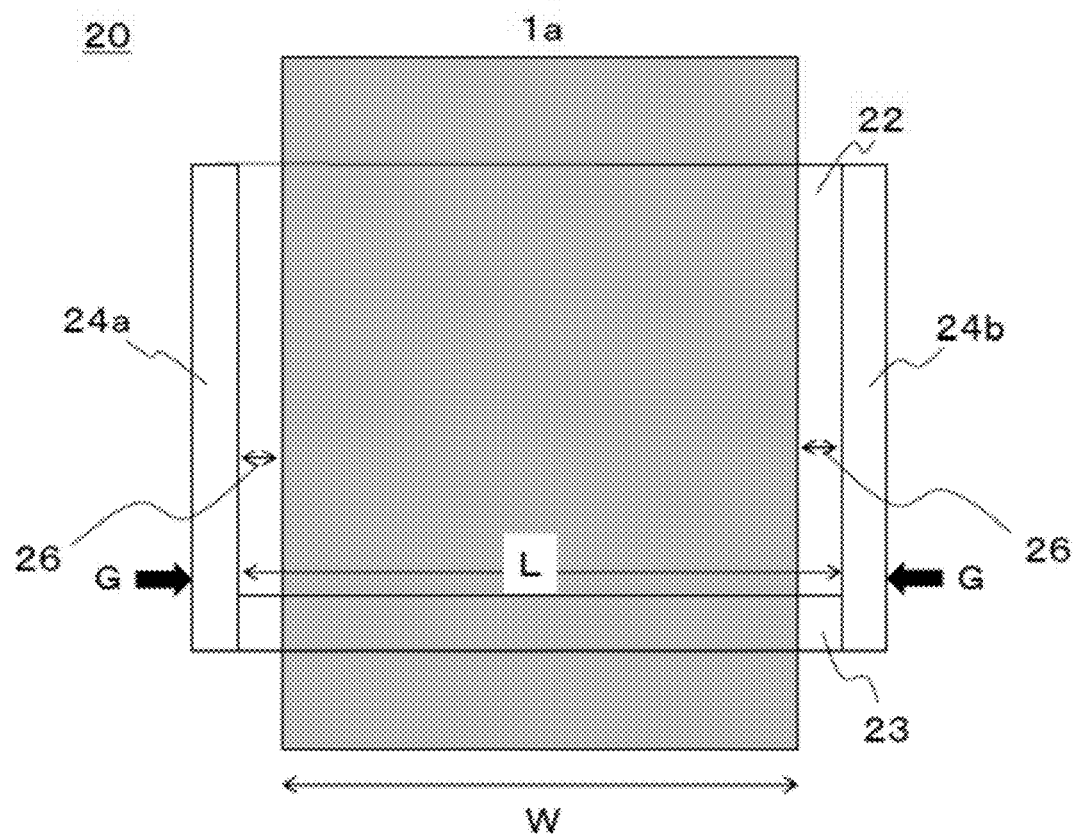

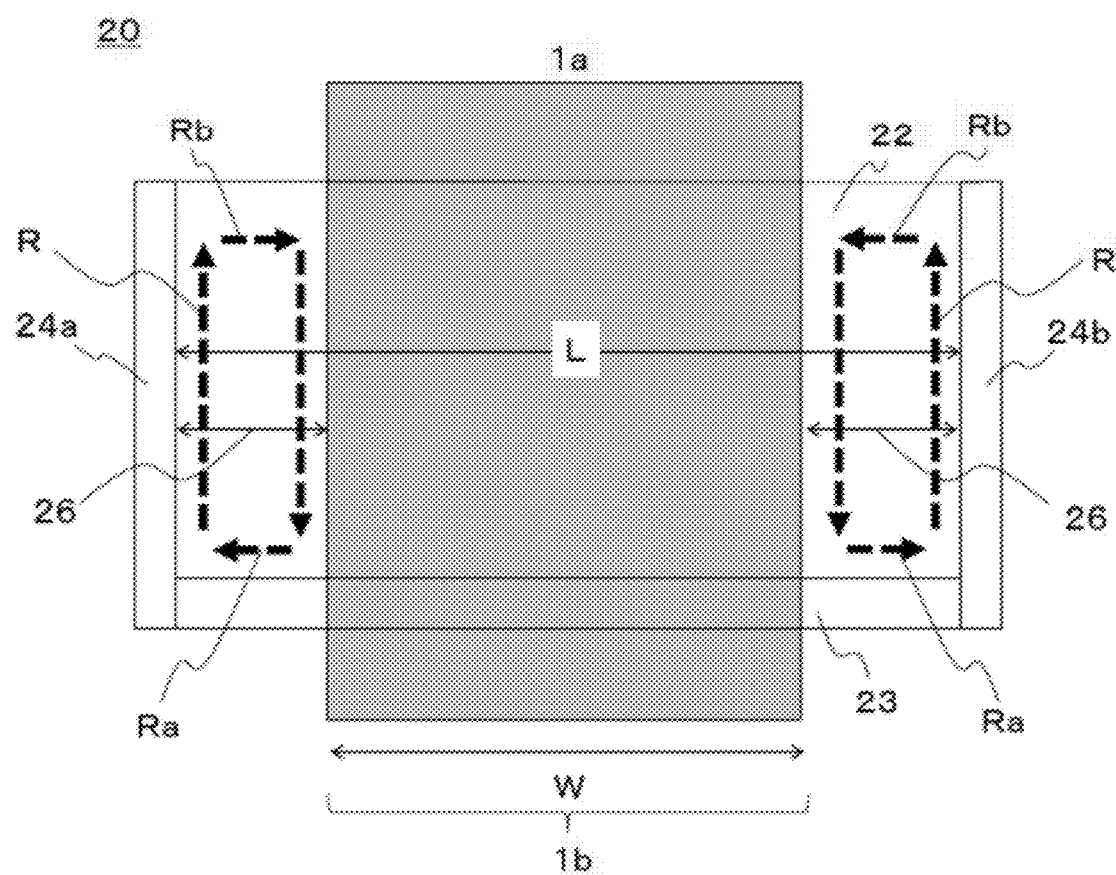

COATING-LIQUID-IMPREGNATED FIBER-REINFORCED FABRIC, SHEET-SHAPED INTEGRATED OBJECT, PREPREG, PREPREG TAPE, AND METHOD FOR MANUFACTURING FIBER-REINFORCED COMPOSITE MATERIAL

CROSS REFERENCE TO RELATED APPLICATIONS

This is the U.S. National Phase application of PCT/JP2019/020471, filed May 23, 2019, which claims priority to Japanese Patent Application No. 2018-107418, filed Jun. 5, 2018, the disclosures of these applications being incorporated herein by reference in their entireties for all purposes.

FIELD OF THE INVENTION

The present invention relates to a method of producing a coating liquid-impregnated reinforcing fiber fabric and a sheet-like integrated object, and particularly relates to a method of impregnating a reinforcing fiber fabric with a coating liquid uniformly.

BACKGROUND OF THE INVENTION

Fiber reinforced composite materials (FRP) in which a matrix resin containing a thermoplastic resin or a thermosetting resin is reinforced with a reinforcing fiber are used in various fields such as aerospace materials, automobile materials, industrial materials, pressure vessels, construction materials, housings, medical applications, and sports applications. Carbon fiber reinforced materials (CFRP) are widely and suitably used particularly in cases where a high mechanical property and lightness are required. On the other hand, in some of the cases where cost has priority over a mechanical property and lightness, glass fiber reinforced composite materials (GFRP) are used. FRP is obtained as an intermediate base material by impregnating a reinforcing fiber bundle with a matrix resin, the intermediate base material is laminated and molded and in addition, thermally cured if a thermosetting resin is used, and then, members composed of FRP are produced. In the above-mentioned applications, planar objects or objects formed by folding planar objects are often used, and two-dimensional sheet-like objects are more widely used as intermediate base materials of FRP than one-dimensional strands and roving-like objects, from the viewpoint of lamination efficiency and moldability achieved in producing such members.

As two-dimensional sheet-like intermediate base materials, prepregs obtained by impregnating, with matrix resins, UD base materials in which reinforcing fibers are unidirectionally arranged and woven fabrics made of reinforcing fibers, are widely used. UD base materials are often used particularly in cases where a mechanical property of FRP has priority. On the other hand, in cases where FRP having complicated shapes are produced, woven fabrics having excellent forming property and shape-steering ability are often used.

A hot-melt process that is one of the methods of producing prepregs is a method in which a matrix resin is melted and then applied onto release paper sheets, a laminated structure is produced in which a UD base material, a woven fabric, or the like is sandwiched between the matrix resin sheets at the upper side and lower side of the UD base material, the woven fabric, or the like, and then, the inside of the UD base material or the woven fabric is impregnated with the matrix resin by heat and pressure. There is a problem in that this method has many steps, cannot increase the production speed, and is costly.

For more efficient impregnation, for example, Patent Literature 1 has made a proposition. This is a method in which glass fiber is melted and spun, and the resulting spinning bundled in strand form or roving form is allowed to pass through a liquid pool filled with a thermoplastic resin and having a conical flow path.

As another example, Patent Literature 2 describes a method in which a coating film is formed on both faces of a sheet-like object simultaneously, but this is a method in which a sheet-like object is allowed to pass through a web-guide and coated using a pipe type doctor blade in order to prevent fluctuation of the sheet-like object in the formation of the coating film.

Further, Patent Literature 3 describes that, in the pultrusion in which a reinforcing fiber bundle is allowed to pass through a manifold filled with a thermoplastic resin and pulled out from the die, the die is ultrasonically vibrated to enhance the impregnating property.

PATENT LITERATURE

Patent Literature 1: WO 2001/028951A1
Patent Literature 2: JP 3252278B
Patent Literature 3: JP H01-178412A

SUMMARY OF THE INVENTION

However, the method in Patent Literature 1 enables only a strand-like or roving-like object to be produced, and is not applicable to producing a prepreg, which is a two-dimensional sheet-like intermediate base material, at which the present invention is directed. In addition, Patent Literature 1 explains that, in order to enhance impregnation efficiency, a thermoplastic resin fluid is allowed to strike against a side of the strand-like or roving-like reinforcing fiber bundle to actively generate turbulence in a conical flow path. This is considered to be intended to disturb part of the arrangement of the reinforcing fiber bundle so that the matrix resin can flow in, but applying this idea to a woven fabric conceivably causes the planarity of the woven fabric to be disturbed and the shape of the woven fabric to be deformed, resulting in not only degrading the grade of the prepreg but also decreasing the mechanical property of FRP.

Further, in the technology disclosed in Patent Literature 2, it is considered that fuzz is generated due to the abrasion with the web-guide before the resin is applied, resulting in the degradation of the grade of the prepreg, and also that the long-term running properties of the woven fabric is limited. In addition, the technology of Patent Literature 2 is intended for coating with resin, not for impregnation.

In the technology of Patent Literature 3 as well, fuzz is likely to be generated since the woven fabric is allowed to pass through a narrow path before the resin is applied, and since this fuzz is brought into the manifold and the die, it is considered that the die is easily clogged with fuzz, and the long-term running properties of the woven fabric is limited.

Thus, an efficient method of applying a coating liquid to a fabric shape such as a woven fabric, particularly an efficient method of producing a prepreg, which is a two-dimensional sheet-like intermediate base material, has not been established yet.

An object of the present invention relates to a method of producing a coating liquid-impregnated reinforcing fiber fabric, and is to provide a production method of a coating liquid-impregnated reinforcing fiber fabric and a sheet-like integrated object, wherein generation of fuzz is suppressed, continuous production is possible without clogging with fuzz, a reinforcing fiber fabric is efficiently impregnated with a coating liquid, and the production speed can be made higher.

The above-mentioned problem is solved by the method of producing a coating liquid-impregnated reinforcing fiber fabric according to the present invention, which includes allowing a reinforcing fiber fabric to pass substantially vertically downward through the inside of a coating section storing a coating liquid to provide the reinforcing fiber fabric with the coating liquid; wherein the coating section includes a liquid pool and a narrowed section which are in communication with each other; wherein the liquid pool has a portion whose cross-sectional area decreases continuously along a running direction of the reinforcing fiber fabric; wherein the narrowed section has a slit-like cross-section and has a smaller cross-sectional area than the top side of the liquid pool; and wherein the vertical height of the portion whose cross-sectional area decreases continuously in the liquid pool is 10 mm or more.

In addition, the method of producing a sheet-like integrated object according to the present invention is a method including: obtaining a coating liquid-impregnated reinforcing fiber fabric by the above-mentioned method of producing a coating liquid-impregnated reinforcing fiber fabric; providing at least one side of the obtained coating liquid-impregnated reinforcing fiber fabric with a release sheet to form a sheet-like integrated object; and taking up the sheet-like integrated object.

Further, the method of producing a prepreg tape according to the present invention is a method including: obtaining a prepreg by the above-mentioned method of producing a prepreg; and then slitting the prepreg.

In addition, the method of producing a fiber reinforced composite material according to the present invention is a method including: obtaining a prepreg or a prepreg tape by the above-mentioned production methods; and curing the prepreg or the prepreg tape.

The method of producing a coating liquid-impregnated reinforcing fiber fabric according to the present invention makes it possible to significantly suppress and prevent clogging with fuzz. Furthermore, the method enables the reinforcing fiber fabric to be run continuously at a high speed, and enhances the productivity of the reinforcing fiber fabric provided with a coating liquid.

Furthermore, the method makes it possible to obtain a reinforcing fiber fabric impregnated uniformly with a coating liquid.

BRIEF DESCRIPTION OF DRAWINGS

FIG. 1 is a schematic cross-sectional view depicting the production method and coating device of a coating liquid-impregnated reinforcing fiber fabric according to one embodiment of the present invention.

FIG. 2 is an enlarged detail cross-sectional view of a portion of the coating section 20 in FIG. 1.

FIG. 3 is a bottom side view of the coating section 20 in FIG. 2, as viewed in the direction A in FIG. 2.

FIG. 4a is a cross-sectional view depicting the structure of the inside of the coating section 20 in FIG. 2, as viewed in the direction B in FIG. 2.

FIG. 4b is a cross-sectional view depicting the flow of the coating liquid 2 in the gap 26 in FIG. 4a.

DETAILED DESCRIPTION OF EMBODIMENTS OF THE INVENTION

Figure 5:
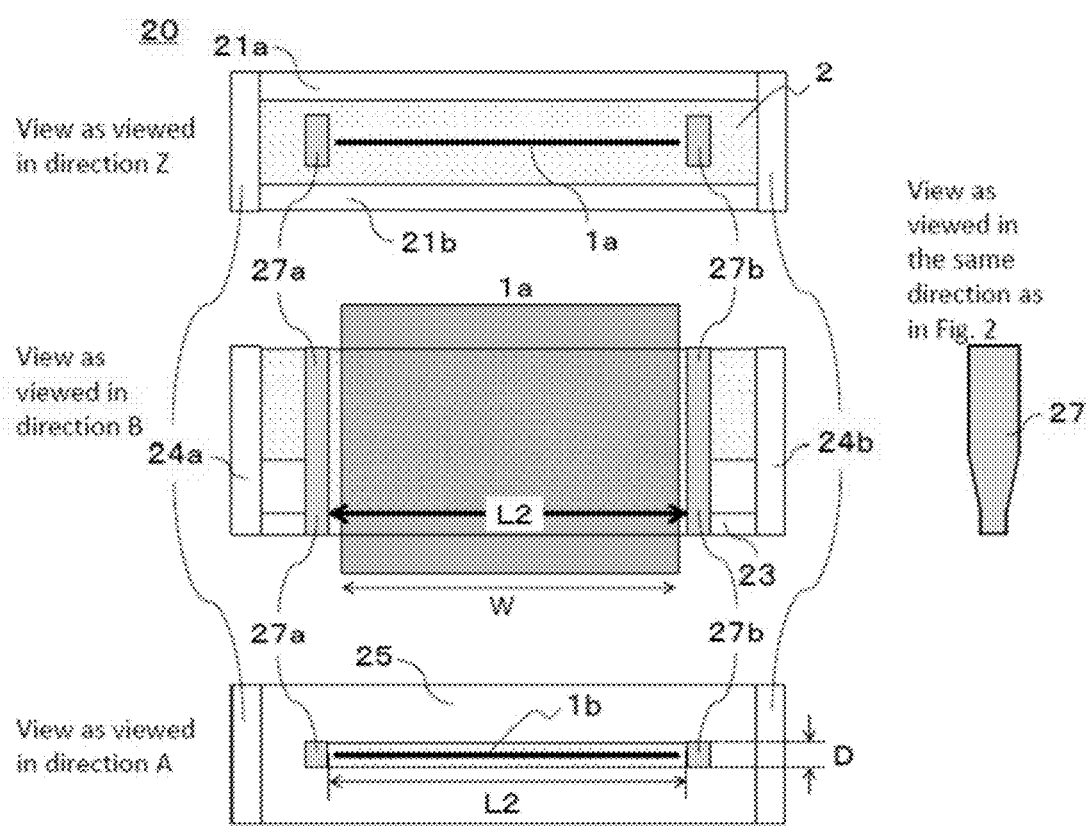
FIG. 5 is a view depicting an installation example of a width regulation mechanism.

Preferred embodiments of the present invention will be described with reference to the drawings. In this regard, the following description illustrates embodiments of the present invention, the present invention is not to be construed to be limited to the embodiments, and various modifications can be made to the invention to the extent that they do not depart from the object and effect of the present invention.

<Outline of Production Method and Coating Device of Coating Liquid-Impregnated Reinforcing Fiber Fabric>

First, the outline of the method of producing a coating liquid-impregnated reinforcing fiber fabric according to the present invention will be described with reference to FIG. 1. FIG. 1 is a schematic cross-sectional view depicting the production method and device of a coating liquid-impregnated reinforcing fiber fabric according to one embodiment of the present invention. A coating device 100 includes: conveyance rolls 13 and 14 as a running mechanism for running a reinforcing fiber fabric 1a in the substantially vertically downward direction Z; and a coating section 20 as a coating mechanism that is disposed between the conveyance rolls 13 and 14 and stores a coating liquid 2. Also before and after the coating device 100, it is possible to provide a supply device 11 for unwinding the reinforcing fiber fabric 1a, nip rolls 12 for withdrawing the reinforcing fiber fabric 1, and a wind-up device 15 for a coating liquid-impregnated reinforcing fiber fabric 1b, and in addition, the coating device 100 is equipped with a supply device for a coating liquid, though the supply device for a coating liquid is not shown in the drawing. In addition, the coating device 100 can be equipped with a release sheet supply device 16 for supplying a release sheet 3, if necessary.

<Reinforcing Fiber Fabric>

Here, examples of the reinforcing fiber include carbon fibers, glass fibers, metal fibers, metal oxide fibers, metal nitride fibers, organic fibers (aramide fibers, polybenzoxazole fibers, polyvinyl alcohol fibers, polyethylene fibers, polyamide fibers, polyester fibers, cellulose or fibers made of derivatives thereof), and the like, and carbon fibers are preferably used, from the viewpoint of the mechanical property and lightness of FRP.

The reinforcing fiber fabric in the present invention is obtained by multiaxially arranging or randomly disposing reinforcing fibers to form the reinforcing fibers into a sheet. That is, the reinforcing fiber fabric has by itself a shape as a sheet. Specific examples thereof include, in addition to woven fabrics and knitted fabrics, those obtained by two-dimensionally disposing reinforcing fibers in a multiaxial way, and those obtained by randomly orienting reinforcing fibers, such as nonwoven fabrics, mats, and papers. In this case, the reinforcing fibers can be formed into a sheet by bonding with a binder, or by using a method such as entanglement, welding or fusion. Examples of the woven fabrics include basic textile weaves of plain weave, twill, and satin, as well as non-crimp woven fabrics, bias structures, leno woven fabrics, multiaxial woven fabrics, multiple woven fabrics, and the like. A woven fabric in which a bias structure and a UD structure are combined, that is, a woven fabric constituted by two fiber bundles including one fiber bundle arranged in the running direction of a reinforcing fiber fabric and the other fiber bundle that intersects diagonally the first fiber bundle in an axisymmetric way, is a preferable embodiment because the deformation of the woven fabric due to the tension in the coating/impregnation step is suppressed by the UD structure and the quasi-isotropy is also achieved by the bias structure. The multiple woven fabric has the advantage that the upper and lower sides of the woven fabric and the structure and characteristics inside the woven fabric can be designed separately. For the knitted fabrics, warp knitting is preferable from the viewpoint of morphological stability in the coating/impregnation step, but braiding, which is a tubular knit fabric, can be also used.

The thickness of the reinforcing fiber fabric is not particularly limited and may be determined, according to the purpose, based on the required performance of FRP and the stability of the coating step. Taking into consideration the processability at the narrowed section, the thickness is preferably 1 mm or less, more preferably 0.3 mm or less.

Reinforcing fiber fabrics which are suitable to the purpose are commercially available or can be produced. Examples thereof are listed below. Examples of woven fabric include "TORAYCA (registered trademark)" cloths C06142, C06347B, and C05642 manufactured by Toray Industries, Inc., "HexForce (registered trademark)" Fabrics and "PrimeTex (registered trademark)" 84, G0801, XAGP282P, 43195, G0939, G0803, 43364, XSGP196P, SGP203CS, XC1400, 48200, 48287, 46150, "Injectex (registered trademark)" fabrics GB201, G0986, G0926 and the like, hybrid woven fabrics of carbon fibers and glass fibers G1088, G0874, G0973, 43743 and the like, aramide fiber woven fabrics 20796 and 21263, and Quartz woven fabrics 610, 593 and the like, manufactured by HEXCEL. Examples of nonwoven fabrics, mats, and papers include, "TORAYCA (registered trademark)" mats B030, B050, BV03 and the like, manufactured by Toray Industries, Inc., and "Carbolight (registered trademark)" CEO-030, CBP-030, ZX-020 and the like, manufactured by Oribest Co., Ltd.

The creels on which a roll of the reinforcing fiber fabric is fitted are preferably provided with a tension control mechanism operated when the reinforcing fiber fabric is withdrawn.

<Smoothing of Reinforcing Fiber Fabric>

In the present invention, increasing the surface smoothness of the reinforcing fiber fabric can enhance the uniformity of the coating amount of the coating liquid in the coating section. For this reason, the reinforcing fiber fabric can be introduced into the coating section after it is smoothed. The smoothing treatment method is not limited to a particular one, and examples thereof include a method in which physical pressure is applied using members having smooth sides such as opposing rolls. A method in which physical pressure is applied using members having smooth sides is easy and convenient, less likely to disturb the arrangement of the reinforcing fibers, and accordingly preferable. More specifically, calendering or the like can be used.

<Preheating of Reinforcing Fiber Fabric>

In the present invention, introducing the reinforcing fiber fabric into the coating section after heating the fabric suppresses a decrease in the temperature of the coating liquid and enhances the viscosity uniformity of the coating liquid, and accordingly, is preferable. The reinforcing fiber fabric is preferably heated up to or to the vicinity of the temperature of the coating liquid, and examples of various heating means that can be used for this purpose include air heating, infrared heating, far-infrared heating, laser heating, contact heating, heat medium heating (steam), and the like. Among others, an infrared heating device is easy and convenient and can directly heat the reinforcing fiber fabric, and accordingly, can achieve efficient heating up to a desired temperature even at a high running speed, and is preferable.

<Coating Liquid>

A coating liquid used in the present invention can suitably be selected in accordance with the purpose of the application, and, for example, for the application of a coating liquid to production of a prepreg, a coating liquid made of a matrix resin can be used. A coating liquid-impregnated reinforcing fiber fabric coated with a matrix resin and obtained according to the present invention is in a state in which the reinforcing fiber fabric is impregnated with a matrix resin, and the coating liquid-impregnated reinforcing fiber fabric can be directly laminated and molded as a sheet-like prepreg to afford members composed of FRP. The degree of impregnation can be controlled in accordance with the design of the coating section and through after-impregnation carried out after coating. A matrix resin can suitably be selected in accordance with the application, and a thermoplastic resin or thermosetting resin is generally used. The matrix resin may be a molten resin melted by heating or a matrix resin which is in a liquid state at room temperature. In addition, the matrix resin may be formed into a solution or varnish using a solvent.

Examples of matrix resins that can be used include matrix resins generally used for FRP, such as thermoplastic resins, thermosetting resins, and photo-curable resins. If these are liquids at room temperature, they may be directly used. If they are solids or viscous liquids at room temperature, they may be heated to decrease the viscosity, may be melted to be used as a melt, or may be dissolved in a solvent to be used as a solution or varnish.

Examples of thermoplastic resins that can be used include polymers having, in the principal chain, a bond selected from a carbon-carbon bond, an amide bond, an imide bond, an ester bond, an ether bond, a carbonate bond, a urethane bond, a urea bond, a thioether bond, a sulfone bond, an imidazole bond, and a carbonyl bond. Specific examples include polyacrylate, polyolefin, polyamide (PA), aramid, polyester, polycarbonate (PC), polyphenylenesulfide (PPS), polybenzimidazole (PBI), polyimide (PI), polyetherimide (PEI), polysulfone (PSU), polyethersulfone (PES), polyetherketone (PEK), polyetheretherketone (PEEK), polyetherketoneketone (PEKK), polyaryletherketone (PAEK), polyamideimide (PAI), and the like. In fields requiring heat resistance, such as aircraft applications, PPS, PES, PI, PEI, PSU, PEEK, PEKK, PAEK, and the like are suitable. On the other hand, in industrial and automobile applications, a polyolefin such as polypropylene (PP), PA, polyester, PPS, and the like are suitable in order to increase molding efficiency. These may be polymers, or oligomers or monomers may be used, because of the low viscosity and low temperature coating. Needless to say, these may be copolymerized depending on the purpose, or various kinds of them can be mixed to be used as polymer blends or polymer alloys.

Examples of thermosetting resins include epoxy resins, maleimide resins, polyimide resins, resins having an acetylene terminal, resins having a vinyl terminal, resins having an allyl terminal, resins having a nadic acid terminal, and resins having a cyanate ester terminal. These can be used generally in combination with a hardener or a curing catalyst. In addition, these thermosetting resins can suitably be used in mixture.

As thermosetting resins suitable for the present invention, epoxy resins are suitably used because epoxy resins have excellent heat resistance, chemical resistance, and mechanical property. In particular, amines, phenols, and epoxy resins whose precursor is a compound having a carbon-carbon double bond are preferable. Specific examples include, but are not limited to: epoxy resins whose precursors are amines, such as various isomers of tetraglycidyl diaminodiphenylmethane, triglycidyl-p-aminophenol, triglycidyl-m-aminophenol, and triglycidylaminocresol; epoxy resins whose precursors are phenols, such as bisphenol A epoxy resins, bisphenol F epoxy resins, bisphenol S epoxy resins, phenol novolac epoxy resins, and cresol novolac epoxy resins; epoxy resins whose precursors are compounds having a carbon-carbon double bond, such as alicyclic epoxy resins; and the like. Bromated epoxy resins resulting from bromating these epoxy resins are also used. Epoxy resins whose precursors are aromatic amines typified by tetraglycidyl diaminodiphenylmethane are most suitable for the present invention because the epoxy resins have good heat resistance and good adhesiveness to reinforcing fibers.

Thermosetting resins are preferably used in combination with hardeners. For example, for epoxy resins, a hardener can be used if the hardener is a compound having an active group capable of reacting with an epoxy group. Preferably, compounds having an amino group, an acid anhydride group, or an azido group are suitable. Specifically, various isomers of dicyandiamide and diaminodiphenyl sulfone are, and amino benzic acid ester types are, suitable. According to specific description, dicyandiamide provides excellent storage stability of prepreg, and accordingly, is used by preference. In addition, various isomers of diaminodiphenyl sulfone afford cured objects having favorable heat resistance, and accordingly, are most suitable for the present invention. As amino benzic acid ester types, trimethyleneglycol di-p-aminobenzoate and neopentylglycol di-p-aminobenzoate are preferably used even though their heat resistance is low, because they have excellent tensile strength compared with diaminodiphenyl sulfone, and accordingly, are used selectively in accordance with the application. Needless to say, a curing catalyst can also be used, if necessary. In addition, a hardener or a curing catalyst and a complexing agent capable of forming a complex can be used together, with a view to enhancing the pot life of a coating liquid.

In the present invention, a mixture of a thermosetting resin and a thermoplastic resin is also suitably used. A mixture of a thermosetting resin and a thermoplastic resin affords better results than a thermosetting resin used singly. This is because a thermosetting resin and a thermoplastic resin have antinomic characteristics, that is, a thermosetting resin is generally disadvantageously brittle but can be molded at low pressure in an autoclave, and contrarily, a thermoplastic resin is generally advantageously tough but difficult to be molded at low pressure in an autoclave, and accordingly, using these in mixture can affect a balance between properties and moldability. Such a mixture to be used preferably contains more than 50 mass % thermosetting resin, from the viewpoint of the mechanical property of FRP obtained by curing prepreg.

<Polymer Particle>

In the present invention, use of a coating liquid containing polymer particles is also preferable because the use can enhance the toughness and impact resistance of the obtained CFRP. In this case, the glass transition temperature (Tg) or melting point (Tm) of polymer particles which is 20° C. or more higher than the temperature of a coating liquid makes it easier to retain the form of polymer particles in the coating liquid, and accordingly is preferable. Tg of polymer particles can be measured under the following conditions using a temperature-modulated DSC. As a temperature-modulated DSC device, Q1000 manufactured by TA Instruments, Inc. is suitable, and this can be used on the basis of calibration carried out using high-purity indium under a nitrogen atmosphere. The measurement conditions can be based on a temperature ramp rate of 2° C./min., and the temperature-modulation condition can be based on a cycle of 60 seconds and an amplitude of 1° C. The reversible components are separated from the total heat flow obtained under these conditions, and the temperature at the midpoint of the step signal can be regarded as Tg.

In addition, Tm can be measured using a common DSC at a temperature ramp rate of 10° C./min., and the temperature at the peak top of the peak-shaped signal corresponding to melting is regarded as Tm.

In addition, the polymer particles are preferably insoluble in a coating liquid, and as such polymer particles, suitable ones described in, for example, WO 2009/142231 as a reference can be used. More specifically, polyamides and polyimides are preferably used, and polyamides that have excellent toughness and accordingly can significantly enhance the impact resistance are most preferable. Examples of polyamides that can be suitably used include nylon12, nylon11, nylon6, nylon66, nylon6/12 copolymers, a nylon modified to have a semi IPN (macromolecular interpenetrating network structure) with an epoxy compound described in Example 1 of JP 01-104624A (semi IPN nylon), and the like. As to the shape of this thermoplastic resin particle, the particle may be a spherical particle, a nonspherical particle, or a porous particle, and the spherical shape is particularly preferable in the production method according to the present invention in order not to decrease the resin flow property. In addition, the spherical shape is a preferable aspect in that the spherical shape has no starting point for stress concentration and affords high impact resistance.

Examples of commercially available polyamide particles that can be used include SP-500, SP-10, TR-1, TR-2, 842P-48, 842P-80 (which are all manufactured by Toray Industries, Inc.), "Orgasol (registered trademark)" 1002D, 2001UD, 2001EXD, 2002D, 3202D, 3501D, 3502D (which are all manufactured by Arkema K.K.), "Grilamid (registered trademark)" TR90 (manufactured by Emser Werke, Inc.), "TROGAMID (registered trademark)" CX7323, CX9701, CX9704 (manufactured by Degussa AG), and the like. These polyamide particles may be used singly or in combination of two or more kinds thereof.

In addition, polymer particles are preferably retained in the interlayer resin layer of CFRP in order to impart high toughness to the interlayer resin layer. For this, the number average particle size of the polymer particle is preferably in the range from 5 to more preferably in the range from 7 to 40 still more preferably in the range from 10 to 30 Having a number average particle size of 5 μm or more makes it possible that the particles do not intrude into the reinforcing fiber bundle, but are retained in the interlayer resin layer of the obtained fiber reinforced composite material. Having a number average particle size of 50 μm or less makes it possible that the thickness of the matrix resin layer on the surface of the prepreg is made suitable, and eventually that the fiber mass content in the obtained CFRP is made suitable.

<Coating Liquid Viscosity>

A coating liquid used in the present invention preferably has an optimal viscosity selected taking into consideration processability and stability. Specifically, it is preferable to have a viscosity in the range from 1 to 60 Pa·s because such a viscosity makes it possible that drip of the coating liquid at the outlet of the narrowed section is suppressed and that the high-speed running properties and stable running properties of the reinforcing fiber fabric are enhanced. As used herein, a viscosity refers to one measured at a strain rate of $3.14$ $s^{-1}$ at a coating liquid temperature in the liquid pool. As a measurement device, a viscoelasticity measurement device such as of a parallel disc type or a conical type can be used. The viscosity of the coating liquid is more preferably 10 to 30 Pa·s.

<Coating Step>

As described in FIG. 1 as a reference, the method of providing the reinforcing fiber fabric 1a with the coating liquid 2 in the coating device 100 is a method in which the reinforcing fiber fabric 1a is withdrawn by the nip rolls 12, and the reinforcing fiber fabric 1a is allowed to pass through the coating section 20 in the substantially vertically downward direction Z to provide both faces of the reinforcing fiber fabric 1a with the coating liquid 2. Thus, the coating liquid-impregnated reinforcing fiber fabric 1b can be obtained.

Furthermore, if necessary, at least one side of the coating liquid-impregnated reinforcing fiber fabric 1b may be provided with a release sheet 3, and the coating liquid-impregnated reinforcing fiber fabric 1b and the release sheet 3 may be simultaneously wound up using the wind-up device 15. In particular, in cases where part or all of the coating liquid 2 applied to the coating liquid-impregnated reinforcing fiber fabric 1b is present on the surface of the coating liquid-impregnated reinforcing fiber fabric 1b and has high fluidity and adhesiveness though the coating liquid 2 has reached the conveyance roll 14, the release sheet 3 can prevent part of the coating liquid 2 on the surface of the coating liquid-impregnated reinforcing fiber fabric 1b from being transferred to the conveyance roll 14. Furthermore, the method can prevent adhesion between the coating liquid-impregnated reinforcing fiber fabrics 1b and provides easy handling in the post-process. The release sheet is not limited to a particular one as long as the release sheet achieves the above-mentioned effect, and examples thereof include not only a release paper but also an organic polymer film whose surface is coated with a release agent, and the like.

Next, with reference to FIGS. 2 to 4, a step of providing the reinforcing fiber fabric 1a with the coating liquid 2 will be described in detail. FIG. 2 is an enlarged detail cross-sectional view of the coating section 20 in FIG. 1. The coating section 20 has wall constituent members 21a and 21b that are opposed to each other with a given gap D in between, and between the wall constituent members 21a and 21b, a liquid pool 22 whose cross-sectional area decreases continuously in the vertically downward direction Z (that is, in the running direction of the reinforcing fiber fabric) and a slit-like narrowed section 23 positioned below the liquid pool 22 (on the discharge side of the reinforcing fiber fabric 1a) and having a cross-sectional area smaller than the cross-sectional area of the top side of the liquid pool 22 (the introduction side of the reinforcing fiber fabric 1a) are formed. In FIG. 2, the reinforcing fiber fabric 1a is arranged in the depth direction of the page.

In the coating section 20, the reinforcing fiber fabric 1a introduced into the liquid pool 22 runs in the vertically downward direction Z, and, at the same time, is accompanied by the coating liquid 2 surrounding the fiber fabric. During this, the accompanying coating liquid 2 is gradually compressed, and the pressure of the coating liquid 2 increases toward the lower portion of the liquid pool 22, because the cross-sectional area of the liquid pool 22 decreases in the vertically downward direction Z (in the running direction of the reinforcing fiber fabric 1a). When the pressure in the lower portion of the liquid pool 22 increases, it is more difficult for the accompanying liquid flow to flow toward the lower portion any further, and the accompanying liquid flows in the direction of the wall constituent members 21a and 21b, and then impeded by the wall constituent members 21a and 21b, resulting in flowing upward. As a result, a circular stream T is formed along the plane of the reinforcing fiber fabric 1a and the wall surfaces of the wall constituent members 21a and 21b in the liquid pool 22. Thus, even if the reinforcing fiber fabric 1a brings fuzz in the liquid pool 22, the fuzz moves along the circular stream T, and cannot approach the lower portion of the liquid pool 22, where the liquid pressure is larger, or the narrowed section 23. Further as below-mentioned, bubbles stick to the fuzz, and accordingly, the fuzz moves upward along the circular stream T, and passes near the liquid surface at the top of the liquid pool 22. This also makes it possible not only that the fuzz is prevented from clogging the lower portion of the liquid pool 22 and the narrowed section 23, but also that the retained fuzz is easily collected through the liquid surface at the top of the liquid pool 22. Furthermore, when the reinforcing fiber fabric 1a is run at a high speed, the liquid pressure further increases, and accordingly, the fuzz elimination effect becomes higher. As a result, this makes it possible to provide the reinforcing fiber fabric 1a with the coating liquid 2 at a higher speed, and enhances productivity significantly.

In addition, the increased liquid pressure has the effect of making it easier for the reinforcing fiber fabric 1a to be impregnated with the coating liquid 2. This is based on the property (Darcy's law) according to which the degree at which a porous object such as a reinforcing fiber bundle is impregnated with a coating liquid is increased by the pressure of the coating liquid. This can also enhance the impregnation effect because running the reinforcing fiber fabric 1a at a higher speed increases the liquid pressure further. In this regard, the coating liquid 2 is impregnated through gas-liquid replacement with bubbles remaining in the reinforcing fiber fabric 1a, and the bubbles are discharged from the gaps in the reinforcing fiber fabric 1a by the liquid pressure and ascending force in the parallel direction (in the vertically upward direction) of the side of the reinforcing fiber fabric. Here, the bubbles are discharged without pushing away the in-coming coating liquid 2 for impregnation, and accordingly, also has the effect of not inhibiting impregnation. In addition, part of the bubbles are discharged in the out-of-plane direction (in the normal direction) from the surface of the reinforcing fiber fabric 1a, and the bubbles are eliminated rapidly by the liquid pressure and ascending force in the vertically upward direction, and accordingly, are not retained in that lower portion of the liquid pool 22 which affords a high impregnation effect, whereby the effect of promoting the discharge of the bubbles efficiently is also achieved. These effects enable the reinforcing fiber fabric 1a to be efficiently impregnated with the coating liquid 2, and, as a result, make it possible to obtain a high quality coating liquid-impregnated reinforcing fiber fabric 1b impregnated uniformly with the coating liquid 2.

In this case, the vertical height H along which the cross-sectional area decreases continuously (see FIGS. 6 to 9) is 10 mm or more. This assuredly affords the length of the region 22a in which the cross-sectional area of the liquid pool 22 decreases continuously, which is a section where the coating liquid 2 accompanying the reinforcing fiber fabric 1a is compressed, whereby the liquid pressure generated in the lower portion of the liquid pool 22 can be increased sufficiently. This consequently makes it possible to obtain the effect of allowing the liquid pressure to prevent fuzz from clogging the narrowed section 23 and the effect of allowing the liquid pressure to induce the impregnation of the reinforcing fiber fabric 1a with the coating liquid 2. In FIG. 2, the entire liquid pool 22 is a region whose cross-sectional area decreases continuously. In addition, in the aspect shown in FIG. 2, since a large region of the circular stream T can be ensured, it is possible to prevent more effectively the fuzz from clogging the narrowed section. The above-described vertical height H along which the cross-sectional area decreases continuously is preferably 50 mm or more. The upper limit of the vertical height H is not particularly limited, but taking into consideration the increased weight of the device and size of the device, is practically about 200 mm or less.

Further, the increased liquid pressure allows the reinforcing fiber fabric 1a to be automatically aligned with the center of the gap D, and the reinforcing fiber fabric 1a is not directly abraded against the wall surfaces of the liquid pool 22 and the narrowed section 23, whereby the effect of suppressing the generation of fuzz here is also achieved. This is because, when any external disturbance or the like causes the reinforcing fiber fabric 1a to approach either side in the gap D, the coating liquid 2 is pushed and compressed in the resulting narrower gap on the approached side, and accordingly, the liquid pressure further increases on the approached side, pushing the reinforcing fiber fabric 1a back to the center of the gap D.

The narrowed section 23 is designed to have a smaller cross-sectional area than the top side of the liquid pool 22. As understood from FIG. 2 and FIG. 4, the smaller cross-sectional area is simply due to the fact that the length in the direction perpendicular to the pseudo-plane of the reinforcing fiber fabric is smaller, that is, the distance between the members is narrower. This is intended to achieve the impregnation and the automatic alignment effect through increasing the liquid pressure in the narrowed section as above-mentioned. In addition, the cross-sectional shape of the uppermost face of the narrowed section 23 is preferably made to conform to the cross-sectional shape of the lowermost face of the liquid pool 22, taking into consideration the running properties of the reinforcing fiber fabric 1a and the flow control of the coating liquid 2, but, if necessary, the cross-sectional shape of the uppermost face of the narrowed section 23 may be made slightly larger.

In this respect, the reinforcing fiber fabric 1a in the coating section 20 in FIG. 2 runs in the completely vertically downward direction Z (at 90 degrees to the horizontal face), but, without limitation to this, may run in the substantially vertically downward direction to the extent that the fuzz collection effect and the bubbles discharge effect can be obtained, and that the reinforcing fiber fabric 1a can run stably and continuously.

In addition, the total amount of the coating liquid 2 applied to the reinforcing fiber fabric 1a can be controlled in the gap D of the narrowed section 23. For example, in cases where the total amount of the coating liquid 2 applied to the reinforcing fiber fabric 1a is desired to be larger (the areal weight is desired to be larger), the wall constituent members 21a and 21b may be disposed in such a manner that the gap D is wider.

FIG. 3 is a bottom side view of the coating section 20, as viewed in the direction A in FIG. 2. In the coating section 20, side plate members 24a and 24b are provided to prevent the coating liquid 2 from leaking by both ends of the reinforcing fiber fabric 1a in the arrangement direction, and the outlet 25 of the narrowed section 23 is formed in the space surrounded by the wall constituent members 21a and 21b and the side wall members 24a and 24b. Here, the outlet 25 is slit-like, and the cross-sectional aspect ratio (Y/D in FIG. 3) may be set in accordance with the shape of the reinforcing fiber fabric 1a which is desired to be provided with the coating liquid 2.

FIG. 4a is a cross-sectional view depicting the structure of the inside of the coating section 20, as viewed in the direction B.

FIG. 4b depicts the flow of the coating liquid 2 in the gap 26. When the gap 26 is large, a circular stream in the edge is generated in the direction of R in the coating liquid 2. This circular stream R in the edge becomes an outward flow (Ra) in the lower portion of the liquid pool 22, resulting the edge deformation of the reinforcing fiber fabric in some cases, and particularly in cases where the reinforcing fiber fabric is a woven fabric, the distance between the reinforcing fibers is expanded, and because of this, there is a possibility that arrangement nonuniformity is caused in the reinforcing fibers in the resulting coating liquid-impregnated reinforcing fiber fabric. On the other hand, the circular stream R becomes an inward flow (Rb) in the upper portion of the liquid pool 22, and accordingly, the reinforcing fiber fabric 1a is compressed in the width direction, resulting in the edge folding of the fiber fabric in some cases.

In view of this, width regulation for making the gap 26 smaller is carried out in the present invention, whereby the generation of the circular stream in the edge is preferably suppressed. Specifically, the width L of the liquid pool 22, that is, the distance L between the side plate members 24a and 24b is preferably adapted to satisfy the following relationship with the width W of the reinforcing fiber fabric measured immediately under the narrowed section 23.

$$L \leq W+10 \text{ (mm)}$$

This suppresses the generation of a circular stream in the edge and makes it possible to suppress the edge deformation and edge folding of the reinforcing fiber fabric 1a and to obtain the coating liquid-impregnated reinforcing fiber fabric 1b in which the reinforcing fibers are uniformly arranged over the full width (W) of the coating liquid-impregnated reinforcing fiber fabric 1b and which is of high grade and has high stability. Furthermore, this technology applied to a prepreg can not only enhance the grade and quality of the prepreg but also enhance the mechanical property and quality of FRP obtained using the prepreg. The relationship between L and W is more preferably $L \leq W+2$ (mm), and thus, the edge deformation and edge folding of the reinforcing fiber fabric can further be suppressed.

In addition, it is preferable to make adjustments so that the lower limit of L is equal to or greater than W−5 (mm), from the viewpoint of enhancing the uniformity of the dimension in the width direction of the coating liquid-impregnated reinforcing fiber fabric 1b.

In this regard, this width regulation is preferably carried out at least in the lower portion of the liquid pool 22 (the G position in FIG. 4a), from the viewpoint of suppressing the generation of the circular stream R in the edge due to a high liquid pressure in the lower portion of the liquid pool 22. Furthermore, this width regulation is more preferably carried out in the whole region of the liquid pool 22, whereby the generation of the circular stream R in the edge can be suppressed substantially completely, and, as a result, the edge deformation and edge folding of the reinforcing fiber fabric can be suppressed substantially completely.

In addition, the width regulation may be carried out only to the liquid pool 22 if it is carried out only from the viewpoint of suppressing the circular stream in the edge in the gap 26, but it is preferable to carry out the width regulation also to the narrowed section 23 in the same way, from the viewpoint of suppressing excessive application of the coating liquid 2 to the sides of the coating liquid-impregnated reinforcing fiber fabric 1b.

<Width Regulation Mechanism>

The above-mentioned has described a case where the side plate members 24a and 24b serve for the purpose of width regulation, but, as shown in FIG. 5, it is also possible to provide width regulation mechanisms 27a and 27b between the side plate members 24a and 24b and to carry out width regulation using such mechanisms. This is preferable because the capability to freely change the width regulated by the width regulation mechanisms makes it possible to use one coating section to produce different coating liquid-impregnated reinforcing fiber fabrics having various widths. Here, the relationship between the width (W) of the reinforcing fiber fabric immediately under the narrowed section and the width (L2) regulated by the width regulation mechanisms at the bottom ends of the width regulation mechanisms is preferably $L2 \leq W+10$ (mm), more preferably $L2 \leq W+2$ (mm). In addition, it is preferable to make adjustments so that the lower limit of L2 is equal to or greater than W−5 (mm), from the viewpoint of enhancing the uniformity of the dimension in the width direction of the coating liquid-impregnated reinforcing fiber fabric 1b. The shape and material of the width regulation mechanism are each not limited to a particular one, and a plate-like bush type is easy and convenient, and accordingly, preferable. In addition, allowing the width regulation mechanism to have a width smaller than the distance between the wall constituent members 21a and 21b in the upper portion, that is, near the liquid surface (as seen in FIG. 5, the width refers to the vertical length of the width regulation mechanism in the "View seen in the Z direction") is preferable because such a width makes it possible not to impede the horizontal flow of the coating liquid. On the other hand, the shape from the middle portion to the lower portion of the width regulation mechanism is preferably in conformity to the internal shape of the coating section because such conformity can make it possible to suppress the retention of the coating liquid in the liquid pool and suppress the degradation of the coating liquid. In this sense, the width regulation mechanism is preferably inserted into the narrowed section 23. FIG. 5 shows an example of a plate-like bush as the width regulation mechanism, and shows an example in which the portion from the middle portion to the lower portion of the bush is in conformity to the tapered shape of the liquid pool 22 and in which the portion is inserted into the narrowed section 23. FIG. 5 shows an example in which L2 is constant from the liquid surface to the outlet, but the width to be regulated may vary depending on the site to the extent that the purpose of the width regulation mechanism is fulfilled. The width regulation mechanism can be fixed in the coating section 20 by any method, and fixing the mechanism of a plate-like bush type at a plurality of sites in the vertical direction can make it possible to suppress variation of the regulation width due to the deformation of the plate-like bush caused by a high liquid pressure. For example, using a stay for the upper portion and inserting the lower portion into the coating section makes it easy to regulate the width by the width regulation mechanism, and accordingly, is preferable.

<Shape of Liquid Pool>

As described above in detail, it is important in the present invention that allowing the cross-sectional area to decrease continuously in the running direction of the reinforcing fiber fabric in the liquid pool 22 increases the liquid pressure in the running direction of reinforcing fiber fabric, and here, the shape of the cross-sectional area decreasing continuously in the running direction of the reinforcing fiber fabric is not limited to a particular one as long as the shape allows the liquid pressure to increase continuously in the running direction. The shape may be a tapered (linear) one or show a curved form such as a trumpet shape in the cross-sectional view of the liquid pool. In addition, the cross-sectional area decreasing portion may be continuous over the full length of the liquid pool, or the liquid pool may contain a part in which the cross-sectional area does not decrease or contrarily increases, to the extent that the object and effect of the present invention can be achieved. These will be described in detail below with reference to FIGS. 6 to 9.

Figure 6:
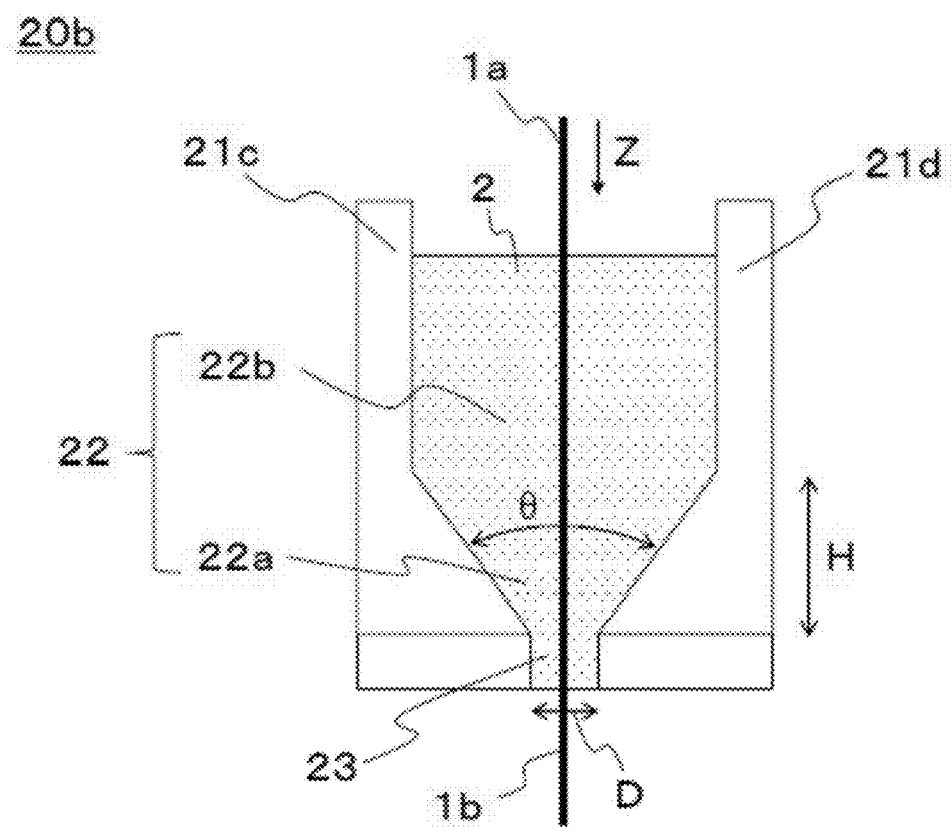
FIG. 6 is a detail cross-sectional view of the coating section 20b according to an embodiment other than in FIG. 2.

FIG. 6 is a detail cross-sectional view of the coating section 20b according to an embodiment other than in FIG. 2. The coating section 20b is the same as the coating section 20 in FIG. 2 except that wall constituent members 21c and 21d constituting the liquid pool 22 are different in shape. As in the coating section 20b in FIG. 6, the liquid pool 22 may be sectioned into the region 22a in which the cross-sectional area decreases continuously in the vertically downward direction Z and the region 22b in which the cross-sectional area does not decrease. In this respect, as described above, in cases where the vertical height H along which the cross-sectional area decreases continuously is 10 mm or more, and preferably 50 mm or more, fuzz clogging can be prevented and the impregnation effect can be enhanced.

In cases where, as in the coating section 20 in FIG. 2 and the coating section 20b in FIG. 6, the region 22a in which the cross-sectional area of the liquid pool 22 decreases continuously is tapered, the smaller the opening angle θ of the taper, the more preferable, and specifically, the angle is preferably an acute angle (90° or less). This makes it possible that the effect of compressing the coating liquid 2 in the region 22a (tapered portion) in which the cross-sectional area of the liquid pool 22 decreases continuously is enhanced, and that a high liquid pressure is made easier to obtain.

Figure 7:
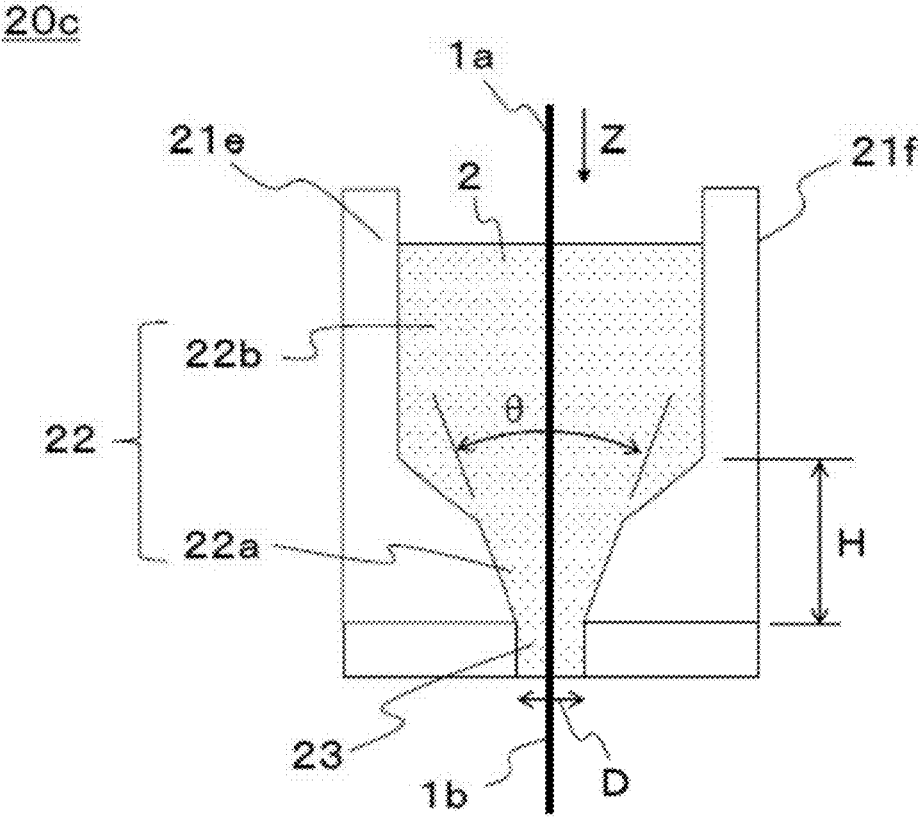
FIG. 7 is a detail cross-sectional view of the coating section 20c according to an embodiment other than in FIG. 6.

FIG. 7 is a detail cross-sectional view of the coating section 20c according to an embodiment other than in FIG. 6. The coating section 20c is the same as the coating section 20b in FIG. 6 except that wall constituent members 21e and 21f constituting the liquid pool 22 form a two-tier taper. In this manner, the region 22a in which the cross-sectional area of the liquid pool 22 decreases continuously may be constituted by a multi-tapered portion composed of two or more tiers. In this respect, the opening angle θ of the tapered portion nearest the narrowed section 23 is preferably an acute angle, from the viewpoint of enhancing the above-mentioned compression effect. Also in this case, the height H of the region 22a along which the cross-sectional area of the liquid pool 22 decreases continuously is preferably 10 mm or more. The vertical height H along which the cross-sectional area decreases continuously is more preferably 50 mm or more. Having a multi-tier tapered portion as the region 22a in which the cross-sectional area of the liquid pool 22 decreases continuously, as in FIG. 7, makes it possible to maintain the volume of the coating liquid 2 that can be stored in the liquid pool 22, and at the same time, to decrease the angle θ of the tapered portion nearest the narrowed section 23. This increases the liquid pressure caused in the lower portion of the liquid pool 22, and can further enhance the fuzz elimination effect and the impregnation effect of the coating liquid 2.

Figure 8:
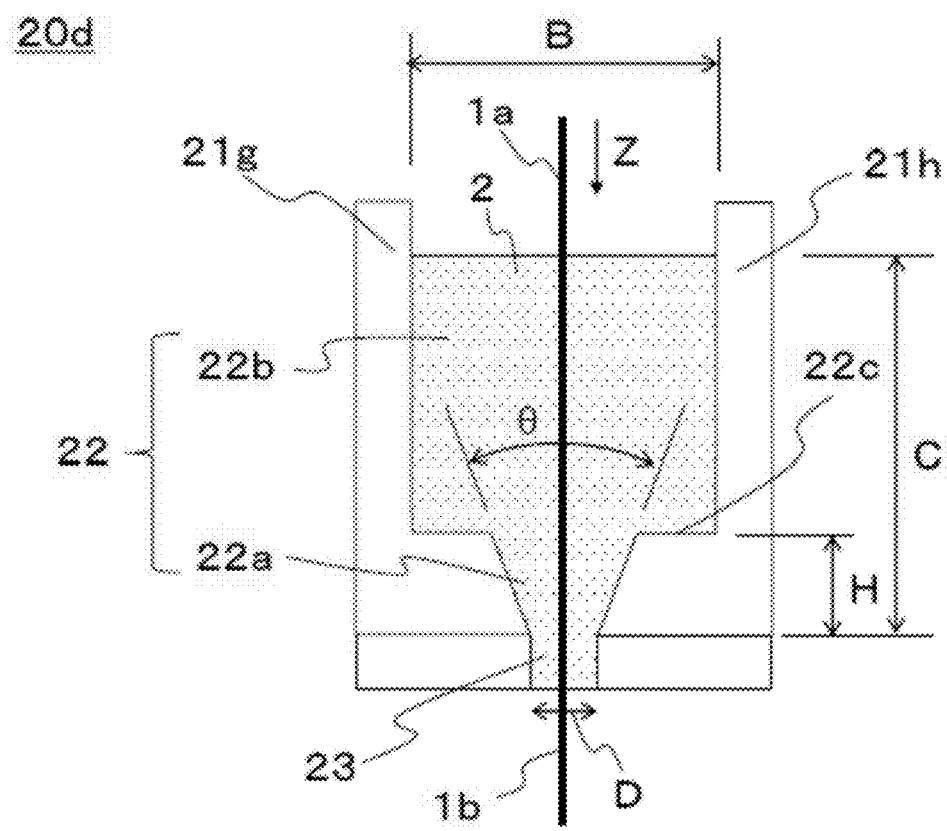
FIG. 8 is a detail cross-sectional view of the coating section 20d according to an embodiment other than in FIG. 6.

FIG. 8 is a detail cross-sectional view of the coating section 20d according to an embodiment other than in FIG. 6. The coating section 20d is the same as the coating section 20b in FIG. 6 except that wall constituent members 21g and 21h constituting the liquid pool 22 form a tier. In this manner, allowing the lowermost portion of the liquid pool 22 to have the region 22a in which the cross-sectional area decreases continuously makes it possible to obtain the effect of increasing the liquid pressure, wherein the effect is an object of the present invention, and accordingly, the other part of the liquid pool 22 may include a region 22c in which the cross-sectional area decreases intermittently. Allowing the liquid pool 22 to have such a shape as in FIG. 8 makes it possible that the shape of the region 22a in which the cross-sectional area decreases continuously is maintained, and at the same time, that the depth B of the liquid pool 22 is enlarged to increase the volume of the coating liquid 2 that can be stored. As a result, even in cases where the coating liquid 2 cannot be supplied into the coating section 20d continuously, the coating liquid 2 can continue to be provided to the reinforcing fiber fabric 1a for a long time, whereby the productivity of the coating liquid-impregnated reinforcing fiber fabric 1b can be enhanced.

Figure 9:
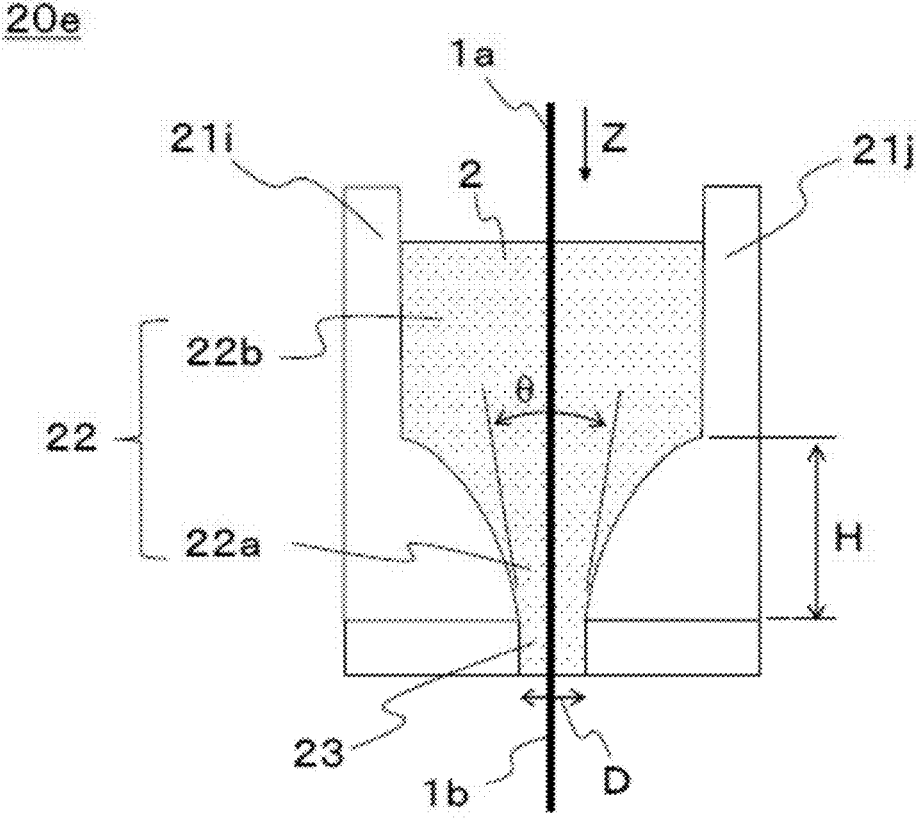
FIG. 9 is a detail cross-sectional view of the coating section 20e according to an embodiment other than in FIG. 6.

FIG. 9 is a detail cross-sectional view of the coating section 20e according to an embodiment other than in FIG. 6. The coating section 20e is the same as the coating section 20b in FIG. 6 except that wall constituent members 21i and 21j constituting the liquid pool 22 form a trumpet shape (curved shape). In the coating section 20b in FIG. 6, the region 22a in which the cross-sectional area of the liquid pool 22 decreases continuously is tapered (linear), but, without limitation to this, may be, for example, in trumpet shape (curved shape) as in FIG. 9. However, the lower portion of the liquid pool 22 and the upper portion of the narrowed section 23 are preferably connected smoothly. This is because any step at the boundary between the lower portion of the liquid pool 22 and the upper portion of the narrowed section 23 causes the reinforcing fiber fabric 1a to be caught by the step, where fuzz will undesirably be generated. In cases where, in this manner, the region in which the cross-sectional area of the liquid pool 22 decreases continuously is in trumpet shape, the opening angle θ between the virtual tangent lines of the lowermost region 22a in which the cross-sectional area of the liquid pool 22 decreases continuously is preferably an acute angle.

In this regard, the above description illustrates an example in which the cross-sectional area decreases smoothly, but the cross-sectional area of the liquid pool in the present invention does not necessarily need to decrease smoothly, to the extent that the object of the present invention is not impaired.

Figure 10:
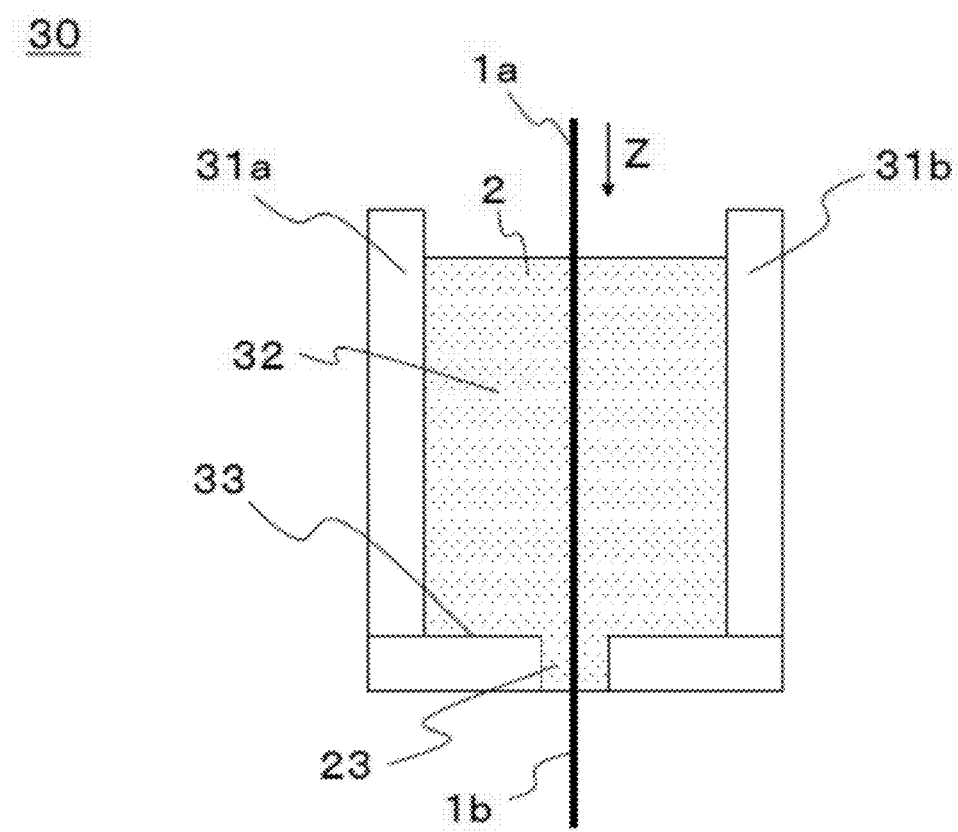
FIG. 10 is a detail cross-sectional view of the coating section 30 according to an embodiment other than of the present invention.

FIG. 10 is a detail cross-sectional view of the coating section 30 according to an embodiment other than of the present invention. Differently from an embodiment of the present invention, the liquid pool 32 in FIG. 10 does not contain a region in which the cross-sectional area decreases continuously in the vertically downward direction Z, but the liquid pool 32 is configured such that the cross-sectional area decreases discontinuously and suddenly at the boundary 33 with the narrowed section 23. This makes it more likely that the reinforcing fiber fabric 1a causes clogging.

Figure 11:
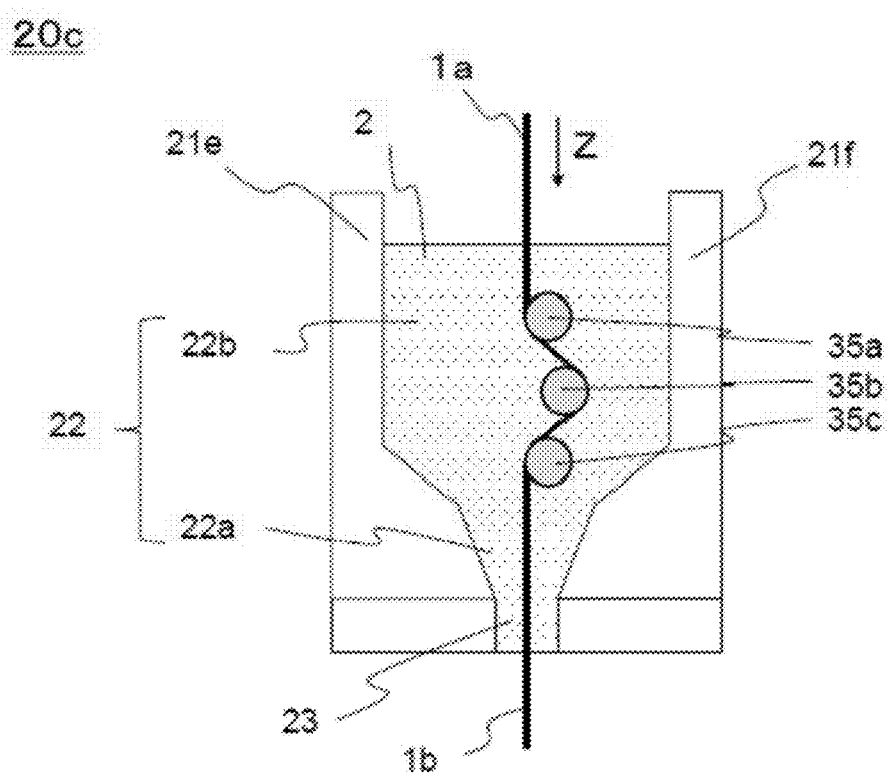
FIG. 11 is a view depicting an aspect in which the liquid pool includes bars, wherein the aspect is an example of an embodiment of the present invention.

In addition, it is also possible to enhance the impregnation effect by allowing the reinforcing fiber fabric to be in contact with a plurality of bars in the coating section. FIG. 11 shows an example in which three bars (35a, 35b, and 35c) are used, and here, the larger the number of bars is, and the longer the contact length between the reinforcing fiber fabric and the bars is, and the larger the contact angle is, the more the degree of impregnation can be enhanced. In the example of FIG. 11, the degree of impregnation can be 90% or more. In this regard, such means for enhancing the impregnation effect may be used in combination of two or more kinds thereof.

<Running Mechanism>

Known rollers or the like can suitably be used as a running mechanism for conveying a reinforcing fiber fabric and the coating liquid-impregnated reinforcing fiber fabric according to the present invention. In the present invention, the reinforcing fiber fabric is conveyed vertically downward, and accordingly, the rollers are preferably disposed above and below the coating section, which is between the rollers.

In addition, it is preferable in the present invention that the running pathway of the reinforcing fiber fabric is as linear as possible in order to suppress arrangement disturbance and fuzzing of the reinforcing fibers. In addition, the running pathway of the sheet-like integrated object is preferably as linear as possible because a bend existing in a conveying step of the sheet-like integrated object that is a laminate of a coating liquid-impregnated reinforcing fiber fabric and a release sheet generates wrinkles due to a perimeter difference between the inner layer and the outer layer in some cases. From this viewpoint, nip rolls are more preferably used in the running pathway of the sheet-like integrated object.

Which of S-shaped arranged rolls and nip rolls should be used can suitably be determined in accordance with the production conditions and the product characteristics.

<High Tension Take-Up Device>

In the present invention, it is preferable that a high tension take-up device for withdrawing the coating liquid-impregnated reinforcing fiber fabric from the coating section is disposed downstream of the coating section in the process. This is because high friction force and shearing stress are generated between the reinforcing fiber fabric and the coating liquid in the coating section, and accordingly, it is preferable that high take-up tension is generated downstream in the process, in order to overcome the high friction force and the shearing stress and withdraw the coating liquid-impregnated reinforcing fiber fabric. As a high tension take-up device, nip rolls, S-shaped arranged rolls, and the like can be used, and in any case thereof, enhancing friction force between the rolls and the coating liquid-impregnated reinforcing fiber fabric can prevent slip and achieve stable running. To achieve this, it is preferable to arrange a high friction coefficient material on the surface of the roll, increase the nip pressure, or increase the pressing pressure of the coating liquid-impregnated reinforcing fiber fabric against the S-shaped arranged rolls. The S-shaped arranged rolls make it possible to more easily control friction force on the basis of the roll diameter and the contact length, and accordingly, are more preferable, with a view to preventing slip.

<Release Sheet Supply Device and Winder>

A release sheet supply device and a winder can suitably be used in producing prepreg or FRP using the present invention. As such a device, any known one can be used, and in any case, it is preferable with a view to running the sheet stably that such a device includes a mechanism for making it possible to feed an unwinding or wind-up tension back to the unwinding or wind-up speed.

<After-Impregnation>

In order to make adjustments to a desired degree of impregnation, it is possible to further combine, with the present invention, a means for further enhancing the degree of impregnation using an impregnation device separately after coating. Here, to distinguish this means from the impregnation in the coating section, such additional impregnation carried out after coating is referred to as after-impregnation, and a device for after-impregnation is referred to as an after-impregnation device. A device used as an after-impregnation device is not limited to a particular one, and can suitably be selected from known ones in accordance with the purpose. For example, as described in JP2011-132389A and WO2015/060299, impregnation can be promoted by preheating a coating liquid-impregnated reinforcing fiber fabric on a hot plate and sufficiently softening the resin on the coating liquid-impregnated reinforcing fiber fabric, followed by using a device for pressing with nip rolls which are also heated. The hot plate temperature and nip roll surface temperature for preheating, the linear pressure of the nip rolls, and the diameter and number of the nip rolls can suitably be selected so as to achieve a desired degree of impregnation. Alternatively, it is also possible to use such "S-wrap rolls" as described in WO2010/150022, wherein a prepreg sheet runs in S-shape through the S-wrap rolls. In the present invention, "S-wrap rolls" are simply referred to as "S-shaped arranged rolls". FIG. 1 in WO2010/150022 describes an example in which a prepreg sheet runs in S-shape, but the contact length between the sheet and the roll may be adjusted in U-shape, V-shape, or A-shape as long as impregnation can be carried out. In addition, opposing contact rolls can be added in cases where the impregnation pressure is increased to enhance the degree of impregnation.

Furthermore, as described in FIG. 4 in WO2015/076981, it is also possible to attempt to increase the production speed of prepreg by arranging a conveyor belt opposite to "5-wrap rolls" and thereby enhancing impregnation efficiency. Alternatively, as described in WO2017/068159, JP2016-203397A, and the like, it is also possible to enhance impregnation efficiency by subjecting prepreg to ultrasonication to heat the prepreg rapidly before impregnation. Alternatively, as described in JP2017-154330A, it is also possible to use an impregnation device in which a plurality of "squeeze blades" are vibrated by an ultrasonic generator. Alternatively, as described in JP2013-22868A, it is also possible to fold a prepreg up and carry out impregnation.

<Simplified after-Impregnation>

The above description shows an example in which a conventional after-impregnation device is applied, but, in some cases, the temperature of the coating liquid-impregnated reinforcing fiber fabric is still high immediately under the coating section, and in such cases, it is also possible to simplify and make smaller an impregnation device significantly by adding an after-impregnation operation at a stage where time has not yet elapsed very much after the fiber fabric exits from the coating section, thereby omitting or simplifying a heating device such as a hot plate for heating the coating liquid-impregnated reinforcing fiber fabric again. An impregnation device positioned immediately under the coating section is referred to as a simplified after-impregnation device. As a simplified after-impregnation device, heated nip rolls and heated S-shaped arranged rolls can be used. Compared with a usual impregnation device, they can make it possible not only to decrease the roll diameter, the set pressure, and the contact length between the prepreg and the rolls, thereby making the device smaller, but also to decrease the power consumption, and accordingly, are preferable.

Figure 15:
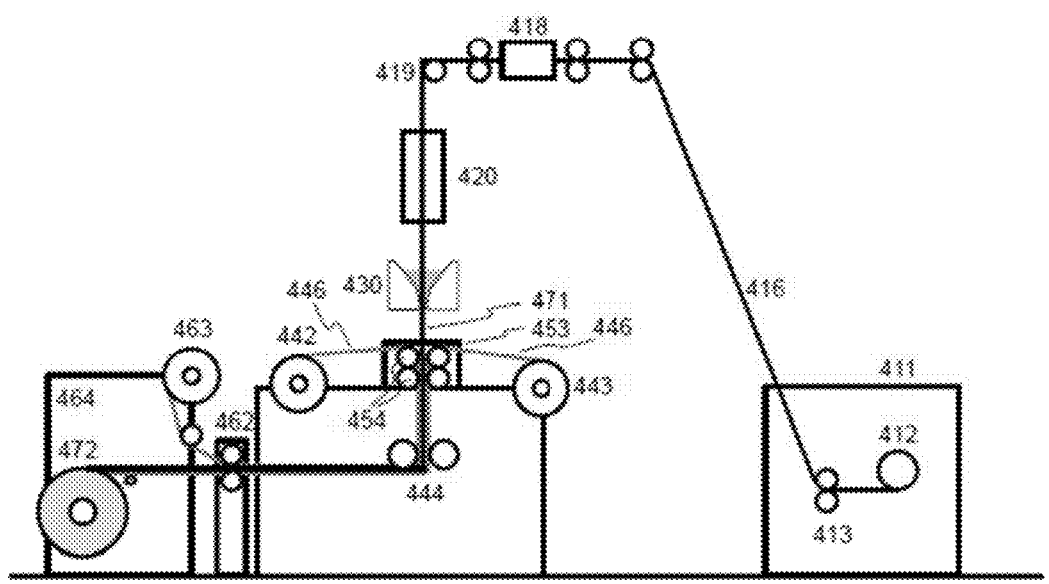
FIG. 15 is a schematic diagram of an example of another process/device of producing a prepreg using the present invention.

In addition, applying a release sheet to the coating liquid-impregnated reinforcing fiber fabric before the coating liquid-impregnated reinforcing fiber fabric enters the simplified after-impregnation device enhances the running properties of the prepreg, and accordingly, is preferable. FIG. 15 shows an example of a production device for a coating liquid-impregnated reinforcing fiber fabric, wherein a simplified after-impregnation device is incorporated in the production device.

<Coating Liquid-Impregnated Reinforcing Fiber Fabric>

The degree of impregnation of the coating liquid is desirably 10% or more in the coating liquid-impregnated reinforcing fiber fabric obtained by the production method according to the present invention. For the degree of impregnation of the coating liquid, the inside of a sampled coating liquid-impregnated reinforcing fiber fabric that has been torn off can be visually checked to see whether the fiber fabric has been impregnated or not. More quantitatively, in cases where the degree of impregnation is low, the fiber fabric can be evaluated by a peeling method (as a reference, impregnation rate of less than 80%), and in cases where the degree of impregnation is high (as a reference, impregnation rate of 80% or more), the water absorption rate of the coating liquid-impregnated reinforcing fiber fabric can be evaluated. In the peeling method, a sampled prepreg is sandwiched between adhesive tapes, these are peeled off, and the reinforcing fiber to which the matrix resin has stuck and the reinforcing fiber to which the matrix resin has not stuck are separated. Then, the ratio of the mass of the whole reinforcing fiber sheet that has been used to the mass of the reinforcing fiber to which the matrix resin has stuck is regarded as an impregnation ratio of the matrix resin based on a peeling method. The water absorption rate is evaluated according to the method described in JP 2016-510077.

<Prepreg Width>

A prepreg that is a kind of precursor of FRP is one form of the coating liquid-impregnated reinforcing fiber fabric obtained in the present invention, and accordingly, a case where the present invention is applied to FRP applications will be described below, wherein the coating liquid-impregnated reinforcing fiber fabric is referred to a prepreg.

The width of a prepreg is not limited to a particular one, and the width may be broad, tens of centimeters to approximately two meters, or may be tape-like, several millimeters to tens of millimeters. The width can be selected in accordance with the application. In recent years, a device called ATL (Automated Tape Laying) or AFP (Automated Fiber Placement) in which narrow prepregs or prepreg tapes are automatically laminated has widely been used to make a prepreg laminating step more efficient, and the width is also preferably adapted to such a device. ATL often involves use of narrow prepregs having a width of approximately 7.5 cm, approximately 15 cm, and approximately 30 cm, and AFP often involves use of prepreg tapes having a width of approximately 3 mm to approximately 25 mm.

Figure 17:
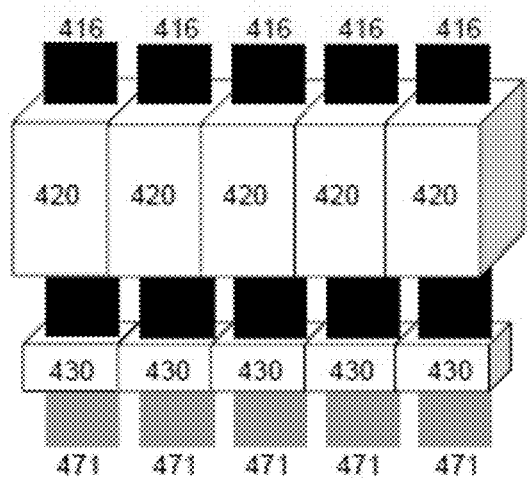
FIG. 17 is a diagram depicting an example of an aspect in which a plurality of coating sections are included, wherein the aspect is according to one embodiment of the present invention.

A method of obtaining a prepreg having a desired width is not limited to a particular one, and a method in which a broad prepreg having a width of approximately 1 m to approximately 2 m is slit into narrow prepregs can be used. Alternatively, in order to simplify or omit the slitting step, the width of the coating section used in the present invention can be adjusted so as to be a desired width from the beginning. For example, in cases where a narrow prepreg having a width of 30 cm is produced for ATL, the width of the outlet of the coating section can be adjusted in accordance with the former width. Further in order to produce this prepreg efficiently, it is preferable to produce a product having a width of 30 cm, and juxtaposing a plurality of such production devices enables prepregs to be produced in a plurality of lines using the same running devices, conveyance devices, various rolls, and winders. FIG. 17 shows an example in which five coating sections are linked in parallel. Here, five reinforcing fiber fabrics 416 may pass through the respective independent five reinforcing fiber preheating devices 420 and coating sections 430 to yield five prepregs 471, or the reinforcing fiber preheating devices 420 may be integrated in parallel, and the coating sections 430 may also be so. In this case, the coating sections 430 have only to include five independent width regulation mechanisms and five independent coating section outlet widths.

<Slit>

The method of slitting prepreg is not limited to a particular one, and a known slitting device can be used. A prepreg may be slit after the prepreg is once wound up and separately mounted in a slitting device, or, to obtain efficiency, a slitting step may be disposed continuously after a prepreg production step without once winding up the prepreg. In addition, the slitting step may be a step in which a 1 m or more broad prepreg is directly slit into prepregs having a desired width, or once cut and split into approximately 30 cm narrow prepregs and then slit again into prepregs having a desired width.

Here, in cases where the above-mentioned plurality of coating sections for narrow prepregs or prepreg tapes are juxtaposed, the respective independent release sheets may be supplied, or a plurality of prepreg sheets may be laminated on one broad release sheet that has been supplied. The width direction edges of the prepreg thus obtained can be cut off and supplied into an ATL or AFP device. In this case, the major part of the edges to be cut off is from the release sheet, and accordingly, the amount of the coating liquid component (the resin component in the case of CFRP) sticking to the slit cutter blade can be decreased, resulting in being also advantageous in that the cleaning cycle for the slit cutter blade can be extended.

<Variation and Application of the Present Invention>

In the present invention, a plurality of coating sections can be used to attempt to make the production process more efficient and more highly capable.

Figure 16:
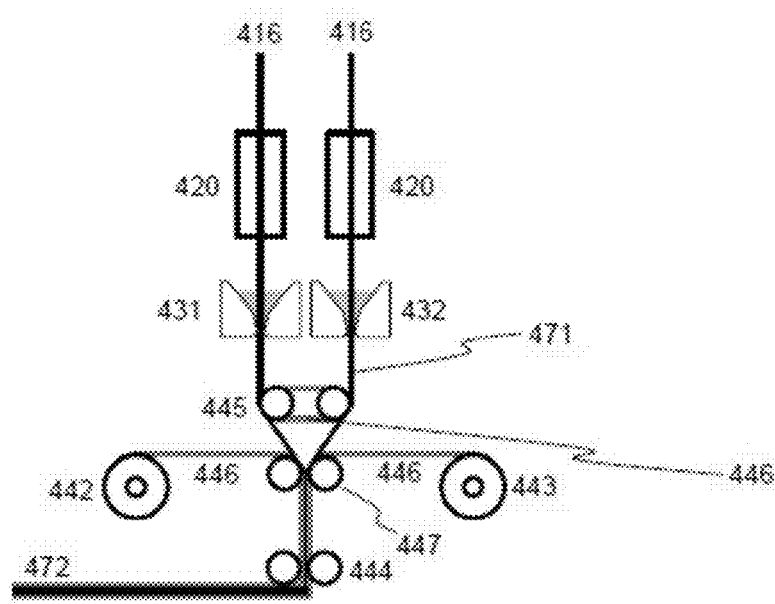
FIG. 16 is a diagram depicting an example of an aspect in which a plurality of coating liquid-impregnated reinforcing fiber fabrics are laminated, wherein the aspect is according to one embodiment of the present invention.

For example, a plurality of coating sections can be disposed so that a plurality of coating liquid-impregnated reinforcing fiber fabrics can be laminated. FIG. 16 shows an example of an aspect in which coating liquid-impregnated reinforcing fiber fabrics are laminated using two coating sections. Two coating liquid-impregnated reinforcing fiber fabrics 471 withdrawn from a first coating section 431 and a second coating section 432 pass by diverting rolls 445, and laminated with release sheets 446 at lamination rolls 447 below. Positioning the release sheet between the coating liquid-impregnated reinforcing fiber fabric and the diverting roll can suppress the adhesion of the coating liquid-impregnated reinforcing fiber fabric to the nip roll and stabilize the running, and accordingly, is preferable. FIG. 16 depicts an example of a device in which the release sheets 446 circuits two diverting rolls 445. In this regard, the diverting roll can be replaced with a diverting guide provided with release treatment, or replaced with the like. In FIG. 16, the high tension take-up device 444 is disposed after the lamination position of the coating liquid-impregnated reinforcing fiber fabrics 471, and obviously, can also be disposed before the lamination position.

Such a lamination type of coating liquid-impregnated reinforcing fiber fabric makes it possible to attempt to make the prepreg lamination efficient, and is effective, for example, in production of a thick type of FRP. In addition, laying up prepregs of a thin type into a multilayer laminate makes it possible to expect that the FRP toughness and the impact resistance are enhanced, and applying the present production method enables a thin type of multilayer laminated prepreg to be obtained efficiently. Furthermore, laminating different kinds of prepregs easily enables a heterobound prepreg having functionality imparted thereto to be obtained easily. In this case, it is possible to change the kind and fineness of the reinforcing fiber, the number of filaments, the mechanical property, the fiber surface property, and the like. In addition, the coating liquid (a resin in the case of prepreg) used can also be a different one. For example, a hetero-bound prepreg in which different prepregs having different thicknesses or different prepregs having different mechanical properties are laminated can be obtained. In addition, a prepreg that can achieve both mechanical properties and tackiness properties can be obtained easily by applying a resin having an excellent mechanical property in the first coating section, applying a resin having excellent tackiness properties in the second coating section, and laminating these. Conversely, a resin having no tackiness properties can also be disposed on the surface. In addition, a prepreg having particles on the surface thereof can be obtained easily by applying a particle-free resin in the first coating section and applying a particle-containing resin in the second coating section.

In another aspect, a plurality of coating sections can be juxtaposed with respect to the running direction of the reinforcing fiber fabric, that is, a plurality of coating sections can be juxtaposed in the width direction of the reinforcing fiber fabric, as illustrated in FIG. 17 and described above. This enables narrow or tape-like types of coating liquid-impregnated reinforcing fiber fabrics to be produced efficiently. In addition, using different reinforcing fibers and different coating liquids for different coating sections makes it possible to obtain a coating liquid-impregnated reinforcing fiber fabric having properties varying in the width direction.

Figure 18:
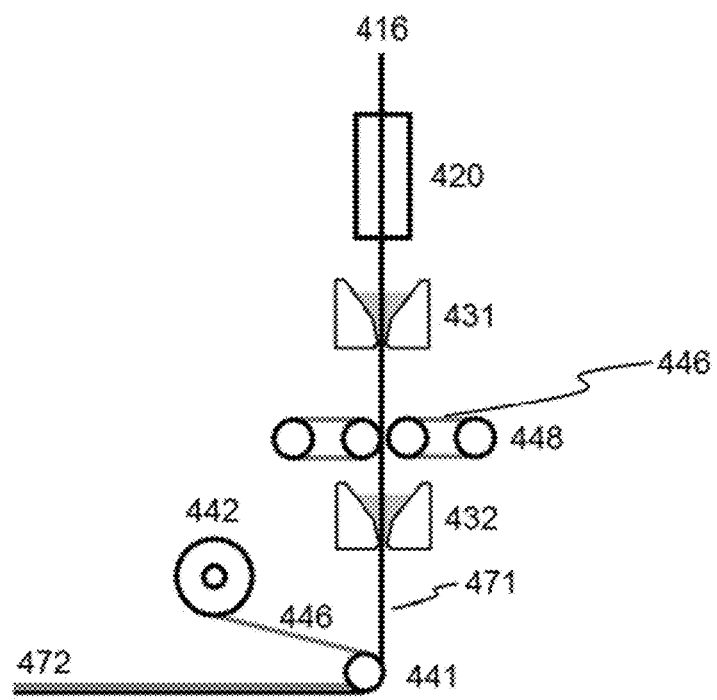
FIG. 18 is a diagram depicting an example of another aspect in which a plurality of coating sections are included, wherein the aspect is according to one embodiment of the present invention.

In another aspect, a plurality of coating sections can also be disposed in series in the running direction of the reinforcing fiber fabric. FIG. 18 shows an example in which two coating sections are disposed in series. Disposing a high tension take-up device 448 between the first coating section 431 and the second coating section 432 is preferable from the viewpoint of stabilizing the running of the reinforcing fiber fabric 416, and can be omitted depending on the coating conditions and the take-up conditions downstream in the process. In addition, positioning a release sheet between the coating liquid-impregnated reinforcing fiber fabric withdrawn from the coating section and the high tension take-up device can suppress the adhesion of the coating liquid-impregnated reinforcing fiber fabric to the nip roll and stabilize the running, and accordingly, is preferable. FIG. 18 depicts an example of a device in which the high tension take-up device 448 is nip rolls, and the release sheets 446 circuits two rolls.

Such a serial type of disposition enables the kinds of coating liquids to be varied in the thickness direction of the coating liquid-impregnated reinforcing fiber fabric. In addition, even using the same kind of coating liquid enables the running stability and the high-speed running properties to be enhanced by allowing the coating conditions to vary depending on the coating section. For example, a prepreg that can achieve both mechanical properties and tackiness properties can be obtained easily by applying a resin having excellent mechanical properties in the first coating section, applying a resin having excellent tackiness properties in the second coating section, and laminating these. Conversely, a resin having no tackiness properties can also be disposed on the surface. In addition, a prepreg having particles on the surface thereof can be obtained easily by applying a particle-free resin in the first coating section and applying a particle-containing resin in the second coating section.

As above-mentioned, some aspects in which a plurality of coating sections are disposed have been shown, the number of coating sections is not limited to a particular one, and the aspects can be applied in various manners in accordance with the purpose. Needless to say, these types of dispositions can also be combined. Furthermore, the various sizes, shapes, and coating conditions (temperature and the like) of the coating section can be used in mixture.

As described above, the production method according to the present invention not only enables the production to be efficient and stable but also enables the product to be made high-performance and capable, and has excellent extendability.

<Coating Liquid Supply Mechanism>

In the present invention, the coating liquid is stored in the coating section, but it is preferable to replenish the coating liquid suitably because the coating progresses. The mechanism for supplying the coating section with a coating liquid is not limited to a particular one, and a known device can be used. Supplying the coating section with a coating liquid continuously makes it possible not to disturb the liquid surface at the top of the coating section and to stabilize the running of the reinforcing fiber fabric, and accordingly, is preferable. For example, the coating liquid can be supplied by its own weight as a driving force from a vessel storing the coating liquid, or supplied continuously using a pump or the like. As a pump, a gear-pump, tube pump, pressure pump, and the like can suitably be used in accordance with the properties of the coating liquid. In addition, in cases where the coating liquid is solid at room temperature, a melter is preferably provided at the upper portion of the storage vessel. In addition, a continuous extruder and the like can be used. As to the supply amount of coating liquid, a mechanism for enabling the coating liquid to be supplied continuously in accordance with the coating amount is preferably provided so that the liquid level of the coating liquid in the upper portion in the coating section can be as constant as possible. For this, for example, a mechanism in which the liquid level and the coating section mass are monitored and fed back to a supply device is conceivable.

<On-Line Monitoring>

In addition, a mechanism for allowing the coating amount to be monitored on-line is preferably provided in order to monitor the coating amount. The on-line monitoring method is not limited to a particular one, and a known one can be used. For example, as a device for thickness measurement, for example, a β-ray gauge can be used. In this case, the coating amount can be estimated by measuring the thickness of a reinforcing fiber fabric and the thickness of a coating liquid-impregnated reinforcing fiber fabric and analyzing the difference between the thicknesses. The coating amount monitored on-line can immediately be fed back to the coating section, and utilized to adjust the temperature of the coating section and the gap D of the narrowed section 23 (see FIG. 2). Needless to say, the coating amount monitoring can be used as defect monitoring. As to the thickness measurement position, for example, in FIG. 12, the thickness of the reinforcing fiber fabric 416 can be measured in the vicinity of the diverting roll 419, and the thickness of the coating liquid-impregnated reinforcing fiber fabric can be measured between the coating section 430 and the diverting roll 441. In addition, on-line defect monitoring is preferably carried out using infrared, near-infrared, camera (image analysis), and the like.

The coating device used in the present invention has a running mechanism and a coating mechanism, wherein the running mechanism allows a reinforcing fiber fabric to run substantially vertically downward, and wherein the coating mechanism is capable of storing the coating liquid in the inside thereof, and further includes a liquid pool and a narrowed section which are in communication with each other, wherein the liquid pool has a portion whose cross-sectional area decreases continuously along the running direction of the reinforcing fiber fabric, and wherein the narrowed section has a slit-like cross-section and has a smaller cross-sectional area than the top side of the liquid pool.

Below, the present invention will be described in detail with reference to a specific example in which a prepreg is produced using the coating device, as an example of a prepreg that is an aspect of the coating liquid-impregnated reinforcing fiber fabric. In this regard, the following description is an example, and the present invention is not construed to be limited to the aspect described below.

Figure 12:
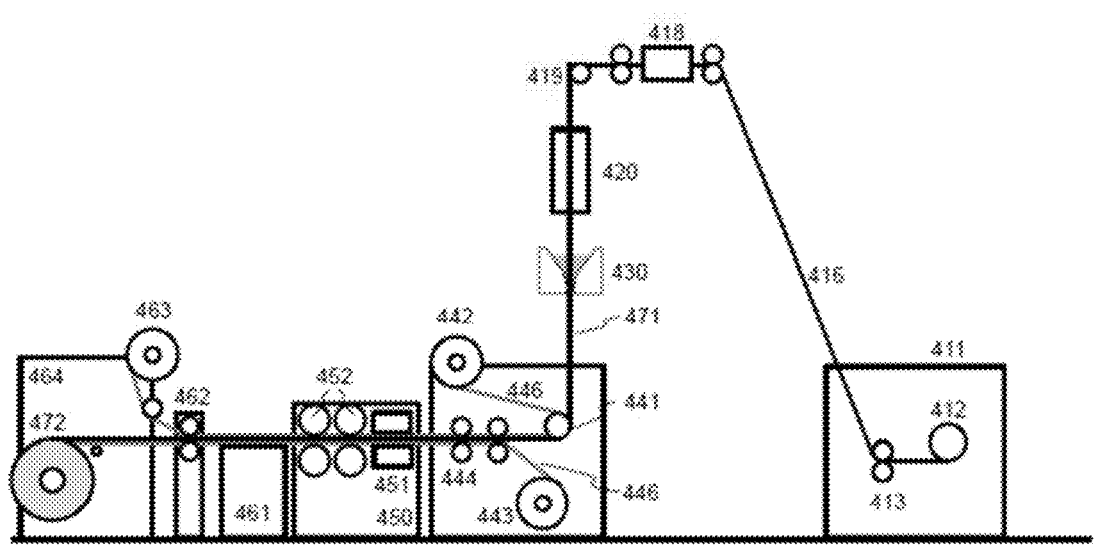
FIG. 12 is a schematic diagram depicting an example of a process/device of producing a prepreg using the present invention.

FIG. 12 is a schematic diagram of an example of a process/device of producing a prepreg using the present invention. The reinforcing fiber fabric roll 412 is fit onto the creel 411, and the reinforcing fiber fabric 416 is withdrawn by the nip rolls 413, and thus guided upward. Here, a braking mechanism provided in the creel enables the reinforcing fiber fabric 416 to be withdrawn at a constant tension. Here, FIG. 12 depicts only one reinforcing fiber fabric roll 412, but in reality, a plurality of reinforcing fiber fabric rolls are possible. Then, the reinforcing fiber fabric passes through a smoothing device 418, passes by a diverting roll 419, and is conveyed vertically downward. In this regard, the smoothing device 418 can be skipped suitably, or omitted depending on the purpose. The reinforcing fiber fabric 416 runs vertically downward from the diverting roll 419, passes through the reinforcing fiber preheating device 420 and the coating section 430, and reaches the diverting roll 441. For the coating section 430, any coating section shape can be adopted to the extent that the object of the present invention can be achieved. Examples include such shapes as in FIGS. 2 and 6 to 9. In addition, a bush can be provided as in FIG. 5, if necessary. In addition, bars can be provided in the coating section as in FIG. 11, if necessary. In FIG. 12, a release sheet 446 unwound from a release sheet (upper side) supply device 442 can be laminated onto the coating liquid-impregnated reinforcing fiber fabric, a prepreg 471 in this case, on the diverting roll 441 to yield a sheet-like integrated object. Furthermore, the release sheet 446 unwound from a release sheet (lower side) supply device 443 can be inserted onto the lower side of the sheet-like integrated object. Here, a release paper, a release film, or the like can be used as a release sheet. The resulting object can be withdrawn into a high tension take-up device 444. FIG. 12 depicts nip rolls as the high tension take-up device 444. Then, the sheet-like integrated object passes through an after-impregnation device 450 including hot plates 451 and heated nip rolls 452, is cooled in a cooling device 461, is taken up by a take-up device 462, followed by peeling off the upper release sheet 446, and then, is wound up in a winder 464, whereby a sheet-like integrated object 472 composed of prepreg and a release sheet can be obtained as a product. The sheet-like integrated object is conveyed basically linearly from the diverting roll 441 to the winder 464, and accordingly, generation of wrinkles can be suppressed. Here, the depiction of a coating liquid supply device and an on-line monitoring device is omitted in FIG. 12.

Figure 13:
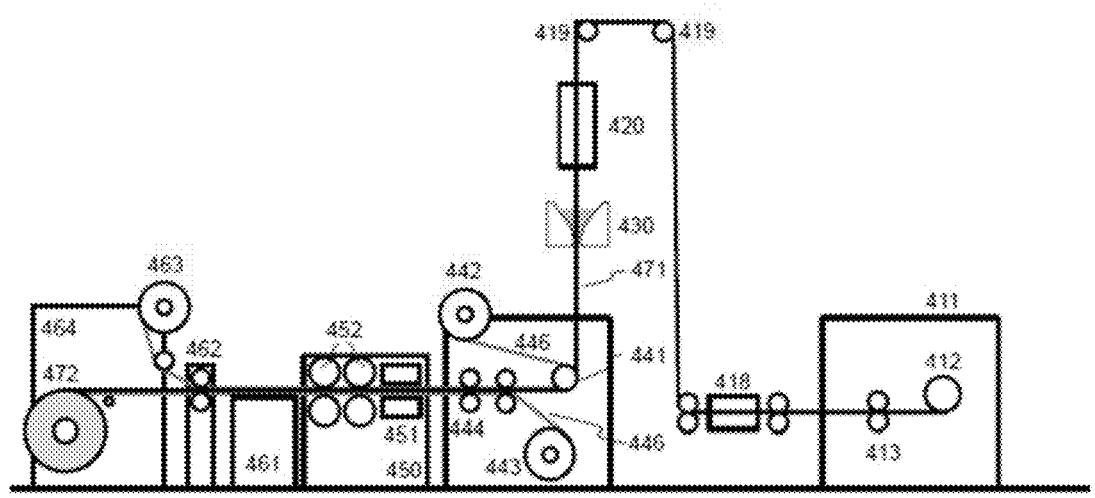
FIG. 13 is a schematic diagram of an example of another process/device of producing a prepreg using the present invention.

FIG. 13 is a schematic diagram of another example of a process/device of producing a prepreg using the present invention. FIG. 13 is different from FIG. 12 in that the reinforcing fiber fabric 416 is withdrawn from the creel 411, and then directly conveyed linearly to the smoothing device 418, followed by introducing the reinforcing fiber fabric 416 upward. Such a configuration eliminates the necessity to install the devices in the upper places and can simplify the installation of platforms and the like significantly.

Figure 14:
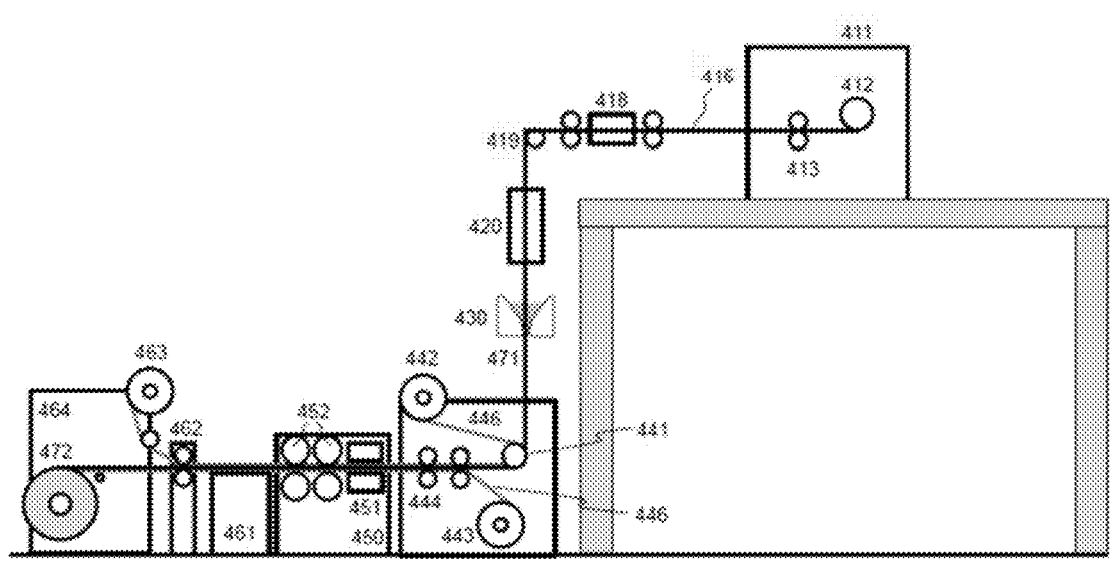
FIG. 14 is a schematic diagram of an example of another process/device of producing a prepreg using the present invention.

FIG. 14 is a schematic diagram of another example of a process/device of producing a prepreg using the present invention. In FIG. 14, the creel 411 is installed upstairs, and the running pathway of the reinforcing fiber fabric 416 is further linearized.

FIG. 15 is a schematic diagram of another example of a process/device of producing a prepreg using the present invention. Shown here is an example in which a simplified after-impregnation device is used, instead of a usual after-impregnation device shown in FIG. 12. In FIG. 15, a simplified after-impregnation device 453 is installed immediately under the coating section 430, and accordingly, the coating liquid-impregnated reinforcing fiber fabric 471 in a high-temperature state is introduced into the simplified after-impregnation device 453, so that the impregnation device can be simplified and made smaller. In FIG. 15, heated nip rolls 454 are depicted as an example, but needless to say, smaller heated S-shaped arranged rolls may be used depending on the purpose. Use of a simplified after-impregnation device also has an advantage in that the whole prepreg production device can be made very compact.

Figure 19:
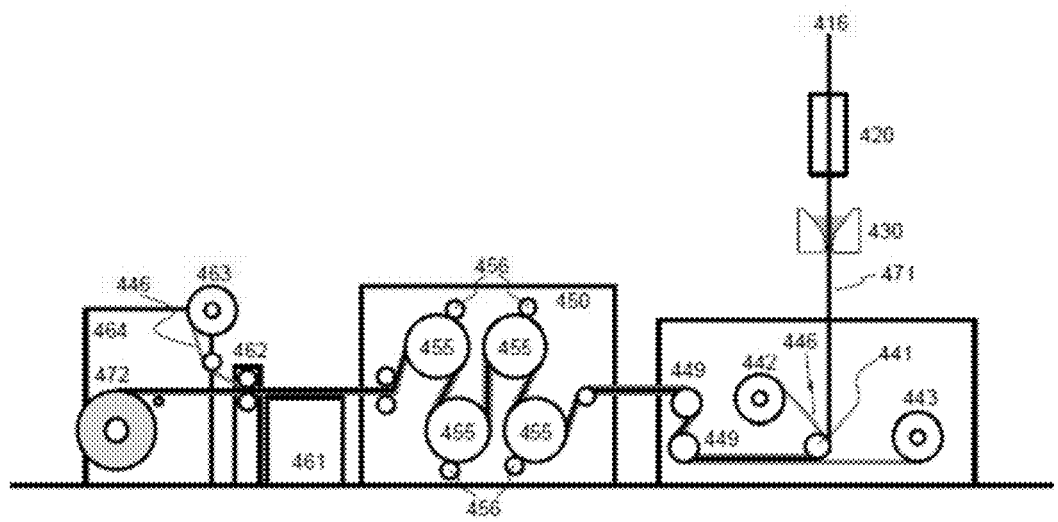
FIG. 19 is a schematic diagram of an example of another process/device of producing a prepreg using the present invention.

FIG. 19 is a schematic diagram of another example of a process/device of producing a prepreg using the present invention. FIG. 19 depicts an example in which high tension take-up S-shaped arranged rolls 449 as a high tension take-up device and two sets of two heated S-shaped arranged rolls 455 (four rolls in total) of an "S-wrap roll" type as an after-impregnation device are used, but the number of rolls may be larger or smaller in accordance with the purpose. In addition, FIG. 19 depicts contact rolls 456 for enhancing the impregnation effect, but the contact rolls can be omitted depending on the purpose.

Figure 20:
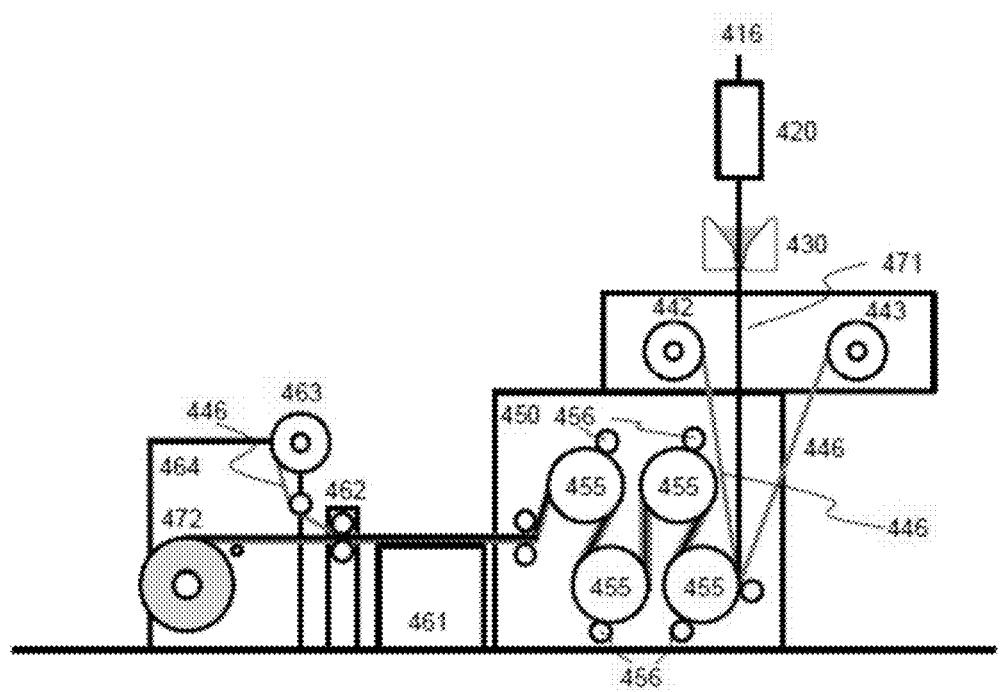
FIG. 20 is a schematic diagram of an example of another process/device of producing a prepreg using the present invention.

FIG. 20 is a schematic diagram of another example of a process/device of producing a prepreg using the present invention. This illustrates an example in which heated S-shaped arranged rolls of an "S-wrap roll" type are used also as a high tension take-up device. This also has an advantage in that the whole prepreg production device can be made very compact.

The present invention can provide an excellent material that can achieve both lightness and high mechanical properties in various fields such as aerospace materials, automobile materials, industrial materials, pressure vessels, construction materials, housings, medical applications, and sports applications. The present invention can be also used for producing a surfacing material for imparting functionality to the FRP intermediate base material surface or the FRP surface.

Examples of conventionally known surfacing materials are shown below. A surfacing material having ultraviolet resistance and abrasion resistance is disclosed in WO2007/127032. A matrix resin film containing an alicyclic epoxy resin, a thermosetting resin, a hardener and/or a curing catalyst, a filler, a pigment, and a flow control agent, and a carrier (polyester mat) are laminated and integrated into this surfacing material. In WO2011/075344, WO2013/086063, WO2014/088866, and WO2017/095810, surfacing materials having an ultraviolet-resistant layer and a conductive layer (a metal foil or a metal fabric is used for imparting conductivity) are disclosed. Furthermore, WO2010/093598 and WO2013/086063 describe an example in which a layer containing a silver flake, a silver nanowire, a carbon nanotube (CNT), conductive carbon black, silver-coated glass bubbles, or the like is provided in order to impart conductivity. In addition, WO2017/112766 discloses a surfacing material on which a release sheet is laminated in order to further improve the releasability from a mold.

In each of the above conventional technologies, a carrier (a woven fabric or a nonwoven fabric made of organic polymer fibers, a woven fabric or a nonwoven fabric made of glass fibers, or the like), a matrix resin film having functionality, and a conductive layer (metal foil, metal fabric, or the like) are laminated and integrated. Thus, the manufacturing process is complicated. However, the present technology can provide efficient production of a surfacing material.

For example, in FIG. 1, a carrier (a woven fabric or a nonwoven fabric made of organic polymer fibers, a woven fabric or a nonwoven fabric made of glass fibers, or the like) is used as the reinforcing fiber fabric 1a, and the resin of WO2007/127032, WO2010/093598, and WO2013/086063 as a reference is used as the resin contained in the coating liquid 2. In this case, a surfacing material can be extremely easily produced as the coating liquid-impregnated reinforcing fiber 1b. Here, the release sheet 3 may be used if necessary, or a release sheet that has been subjected to a conductive treatment may be used.

Figure 21:
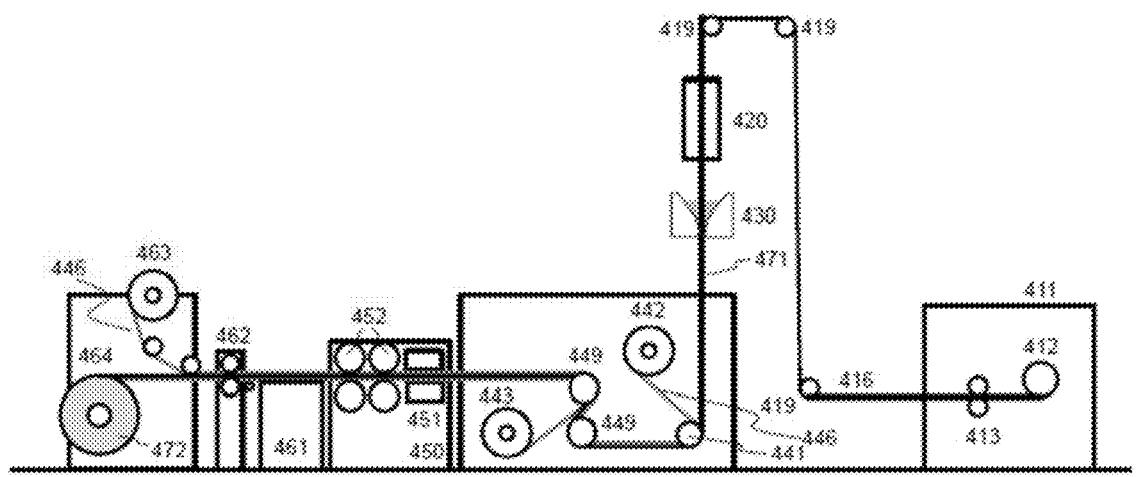
FIG. 21 is a schematic diagram of another process/device of producing a prepreg using the present invention.

Further, in order to produce a conductive surfacing material, in FIG. 21 for example, the carrier described in the above pamphlets (a woven fabric or a nonwoven fabric made of organic polymer fibers, a woven fabric or a nonwoven fabric made of glass fibers, or the like) is used as the reinforcing fiber fabric 416, and the conductive layer (metal foil, metal fabric, or the like) described in the above pamphlets is arranged in the release sheet (lower side) supply device 443. Thus, a conductive surfacing material can be obtained. Further, as shown in FIG. 16, it is possible to introduce the carrier and the conductive layer into separate coating sections 431 and 432, apply the matrix resin, and then laminate carrier and the conductive layer downstream in the process. It is also possible to introduce a reinforcing fiber fabric and a metal foil or a release sheet subjected to a conductive treatment as a conductive layer into one coating section, and apply a matrix resin to integrally obtain a conductive surfacing material.

Further, in FIGS. 21 and 16, by disposing a release sheet in the release sheet (upper side) supply device 442, it is possible to obtain a surfacing material having conductivity and releasability.

More specific examples will be described below.

From the viewpoint of making a surfacing material as thin as possible, the reinforcing fiber fabric used as a carrier for the surfacing material preferably has an areal weight of 5 to 50 g/m$^2$, and more preferably 10 to 30 g/m$^2$.

As the matrix resin, from the viewpoint of ultraviolet resistance and abrasion resistance, an alicyclic epoxy resin as described in WO2007/127032 can be used, and for the purpose of adjusting the viscosity of the coating liquid, the pre-cured resin thereof may be used suitably. Further, in order to impart thixotropy to the matrix resin, silica or various ceramic fine particles can be contained in the coating liquid. In addition, various pigments are preferably used from the viewpoint of improving the design.

For the matrix resin, the resin as described in WO2013/086063 can be used from the viewpoint of further adding impregnating property, and the resins as described in WO2010/093598 and WO2013/086063 can be used from the viewpoint of further adding/improving conductivity. The resins as described in WO2011/075344, WO2014/088866, and WO2017/095810 can be also used.

As described above, a surfacing material can be obtained by using the present invention, but the scope of application of the present invention is not limited to the above examples, and a carrier, a matrix resin, a conductive layer, a release sheet and the like can be designed and selected depending on the purpose.

EXAMPLES

<Reinforcing Fiber Fabric>

Carbon fiber woven fabric 1 ("TORAYCA (registered trademark)" cloth C6343B, manufactured by Toray Industries, Inc.)

Carbon fibers: "TORAYCA (registered trademark)" T300B (3K))

Textile weave: Plain weave

Warp density: 12.5 threads/25 mm, Weft density: 12.5 threads/25 mm

Areal weight: 198 g/m$^2$, thickness: 0.23 mm

Carbon fiber woven fabric 2 ("TORAYCA (registered trademark)" cloth CK6273C, manufactured by Toray Industries, Inc.)

Carbon fibers: "TORAYCA (registered trademark)" T700S (12K))

Textile weave: Plain weave

Warp density: 3 threads/25 mm, Weft density: 3 threads/25 mm

Areal weight: 192 g/m$^2$, thickness: 0.21 mm

<Coating Liquid>

Thermosetting Epoxy Resin Composition 1 (Coating Liquid A):

A mixture of an epoxy resin (a mixture of an aromatic amine type of epoxy resin and a bisphenol type of epoxy resin), a hardener (diaminodiphenyl sulfone), and polyethersulfone; containing no polymer particles. The viscosity of this thermosetting epoxy resin 1 was measured using the ARES-G2 manufactured by TA Instruments, Inc. at a measurement frequency of 0.5 Hz at a temperature ramp rate of 1.5° C./minute and was found to be 50 Pas at 75° C., 15 Pas at 90° C., and 4 Pas at 105° C.

Thermosetting Epoxy Resin Composition 2 (Coating Liquid B):

To a mixture of an epoxy resin (a mixture of an aromatic amine type of epoxy resin and a bisphenol type of epoxy resin), a hardener (diaminodiphenyl sulfone), and polyethersulfone, "particle 3" (having a Tg of 150° C.) described in EXAMPLES in JP2011-162619A was added as polymer particles so as to account for 13 mass % of the whole mass of the resin composition as 100 mass %, and the resulting mixture was used.

The viscosity of this thermosetting epoxy resin 2 was measured using the ARES-G2 manufactured by TA Instruments, Inc. at a measurement frequency of 0.5 Hz at a temperature ramp rate of 1.5° C./minute and was found to be 118 Pas at 75° C., 32 Pas at 90° C., and 10 Pa·s at 105° C.

<Prepreg Production Device> A device configured as described in FIG. 21 (the depiction of a resin supply section is omitted).

<Coating Section> The coating section type 20c in the form depicted in FIG. 7 (the liquid pool 22 is tapered in two tiers)

In the coating section 20c, stainless steel blocks were used as the wall constituent members 21e and 21f forming the liquid pool 22 and the narrowed section 23, and stainless steel plates were used as the side plate members 24a and 24b. Furthermore, to heat the coating liquid, a plate heater was attached to the periphery of the wall constituent members 21e and 21f and the side plate members 24a and 24b, and the temperature and viscosity of the coating liquid were adjusted with a temperature measurement being made using a thermocouple. In addition, the running direction of the reinforcing fiber fabric 416 was the vertically downward direction, the liquid pool 22 was tapered in two tiers, the opening angle of the upper taper was 17°, the opening angle of the lower taper was 7°, and the taper had a height (i.e., H) of 50 mm unless otherwise specified. In addition, a plate-like bush 27 conformed to the internal shape of the coating section was provided as a width regulation mechanism, as described in FIG. 5, and furthermore, the installation position of the plate-like bush was made freely variable so that L2 could suitably be adjusted. The width Y of the narrowed section 23 was adapted to become 300 mm when L2 was 300 mm. The gap D of the narrowed section 23 was 0.3 mm unless otherwise specified. In this case, the aspect ratio of the outlet slit was 1500. In addition, the space external to each bush was closed off at the bottom outlet of the narrowed section so that the coating liquid could not leak through the outlet of the narrowed section.

In the production of the prepreg, the reinforcing fiber fabric 416 was withdrawn by the nip rolls 413 and was guided upward. Then, the reinforcing fiber fabric 416 was passed by the diverting roll 419, conveyed vertically downward, heated in the reinforcing fiber preheating device 420 to the temperature equal to or greater than the temperature of the coating section, introduced into the coating section 430, and coated with the coating liquid. Then, the coating liquid-impregnated reinforcing fiber fabric (prepreg) 471 was withdrawn from the coating section 430, laminated with the upper release sheet 446 (a release paper in this case) on the diverting roll 441, and taken up by the high tension take-up S-shaped arranged rolls 449. Then, the lower release sheet 446 (release paper in this case) was supplied to the upper roll of the high tension take-up S-shaped arranged rolls 449 to form a sheet-like integrated object which was a prepreg sandwiched between release paper sheets. Furthermore, this was introduced into the after-impregnation device 450 including the hot plates 451 and the heated nip rolls 452, and was optionally subjected to after-impregnation. Then, the resulting object was passed through the cooling device 461, the upper release paper was peeled off, and the sheet-like integrated object 472 was wound up.

Example 1

A 300 mm wide prepreg was produced using the coating liquid A as a coating liquid, using two plate-like bushes as a width regulation mechanism, with the distance L2 set to 300 mm between the bottom ends of the bushes, and using the carbon fiber woven fabric 1 cut to a width of 300 mm as a reinforcing fiber fabric. However, in this Example 1, the hot plates 451 and the heated nip rolls 454 in the after-impregnation device 450 were not used, and after-impregnation was not carried out. In this regard, the coating liquid temperature in the liquid pool was 90° C. (corresponding to 15 Pa·s). In addition, the running speeds of the reinforcing fiber fabric and the prepreg were 10 m/minute. The various stable running evaluation items and the degree of impregnation related to this Example are shown in Table 1. To evaluate the running stability (continuous productivity) of a reinforcing fiber fabric in the coating liquid providing section, the reinforcing fiber fabric was run continuously for 30 minutes. One which caused no fuzz clogging nor yarn breaking was rated as "Good", and one which caused fuzz clogging and yarn breaking was rated as "Bad". Furthermore, to evaluate the state in which the obtained coating liquid-impregnated reinforcing fiber fabric was provided with the coating liquid (coating liquid application property), the surface of the coating liquid-impregnated reinforcing fiber fabric was checked by visual observation. The surface wet with the coating liquid was rated as "Good", and the surface not wet with the coating liquid was rated as "Bad". Furthermore, to examine the impregnating property of the coating liquid into the reinforcing fiber fabric, a coating liquid-impregnated reinforcing fiber fabric was quickly obtained immediately under the coating device, and the impregnating property of the coating liquid (impregnating property) was checked by visual observation. The coating liquid-impregnated reinforcing fiber fabric within which the fibers were wet with the coating liquid was rated as having "Good" impregnating property, and the coating liquid-impregnated reinforcing fiber fabric only at and near the surface of which the fibers were wet with the coating liquid was rated as having "Bad" impregnating property.

Furthermore, to evaluate a sign of fuzz clogging, the coating section was dismantled after each of the 30-minute and the 60-minute continuous running, the liquid contact surface of each of the wall constituent members 21 was checked by visual observation for fuzz. The fuzz prevention properties were evaluated as follows: the fuzz prevention properties by virtue of which fuzz stuck to or to the vicinity of the narrowed section 23 after the continuous running was rated as "Poor"; the fuzz prevention properties by virtue of which fuzz stuck to the portion far from the narrowed section 23 (to and to the vicinity of the upper portion of the liquid pool 22) after the continuous running was rated as "Fair"; the fuzz prevention properties by virtue of which no fuzz stuck to the liquid contact surface of any of the wall constituent members 21 after the continuous running was rated "Good".

In addition, the uniformity of the areal weight of the prepreg in the width direction was evaluated as below-mentioned. The 300 mm wide prepreg obtained in Example 1 was cut into a right edge, a center portion, and a left edge in the width direction, 100 mm square each, and the mass of the prepreg and the mass of the carbon fiber were each measured for three test samples (n=3). The mass of the carbon fiber was measured as a residue obtained by eluting the resin from the prepreg with a solvent. From these, the average values for each sampling position were calculated, the average values for each sampling position were compared, and both the carbon fiber and the resin were found to fall within the range of ±2 mass % and exhibit excellent areal weight uniformity.

TABLE 1

| | | Example 1 | Example 2 | Comparative Example 1 | Comparative Example 2 |
|---|---|---|---|---|---|
| Operational conditions | Running direction of fiber bundle | Vertical direction (Downward) | Vertical direction (Downward) | Vertical direction (Downward) | Vertical direction (Downward) |
| | Continuous decrease in cross-sectional area of liquid pool | Present | Present | Present | Absent |
| | Taper height H | 50 mm | 10 mm | 5 mm | Absent (0) |

TABLE 1-continued

| | | Example 1 | Example 2 | Comparative Example 1 | Comparative Example 2 |
|---|---|---|---|---|---|
| Evaluation items | Running stability (continuous productivity) | Good | Good | Bad | Bad |
| | Fuzz prevention properties (30 minutes) | Good | Fair | — | — |
| | Fuzz prevention properties (60 minutes) | Good | Poor | — | — |
| | Coating liquid application property (visual) | Good | Good | Good | — |
| | Impregnating property (visual) | Good | Good | Good | — |

Example 2

Coating was performed in the same manner as in Example 1 except that the taper of the coating portion had a height of 10 mm. Excellent running stability was shown.

Comparative Example 1

Coating was performed in the same manner as in Example 1 except that the taper of the coating portion had a height of 5 mm. A few minutes after the start of running, the reinforcing fiber fabric got clogged in the coating section and became unable to run. Then, the coating section 20 was dismantled. The narrowed section 23 was clogged with fuzz.

Comparative Example 2

Coating was performed in the same manner as in Example 1 except that the liquid pool in the coating section did not have, unlike the present invention, a continuously decreasing cross-sectional area as shown in FIG. 10. The reinforcing fiber fabric got immediately clogged in the coating section and became unable to run. Then, the coating section 30 was dismantled. The narrowed section 23 was clogged with fuzz.

Examples 3 and 4

A coating liquid-impregnated reinforcing fiber fabric was produced in the same manner as in Example 1 except that the distance L2 between the bottom ends of the width regulation mechanism was changed to "L2–W" of 10 mm (Example 3) and 20 mm (Example 4). The edge deformation or edge folding of the coating liquid-impregnated reinforcing fiber fabric, which was observed in Example 1 in which "L2–W" was 0 mm, was not observed, with a good form (Excellent). However, in Example 3 in which "L2–W" was 10 mm, some edge folding/deformation was observed, although they were not problematic (Good). In Example 4 in which "L2–W" was 20 mm, although not problematic, edge folding was observed (Fair), and some edge deformation was also observed (Good).

TABLE 2

| | | Example 1 | Example 3 | Example 4 |
|---|---|---|---|---|
| Operational condition | L2-W | 0 mm | 10 mm | 20 mm |
| Evaluation items | Edge deformation | Excellent | Good | Good |
| | Edge folding | Excellent | Good | Fair |

Example 5

A coating liquid-impregnated reinforcing fiber fabric was produced in the same manner as in Example 1 except that the coating liquid B was used as a coating liquid. In this Example, the running stability was "Good," but the fuzz prevention properties after 60-minute continuous running was "Fair".

Example 6

A coating liquid-impregnated reinforcing fiber fabric was produced in the same manner as in Example 5 except that the temperature of the coating liquid was 105° C. In this Example, the running stability was "Good," and the fuzz prevention properties after 60-minute continuous running was also "Good".

Example 7

A coating liquid-impregnated reinforcing fiber fabric was produced in the same manner as in Example 1 except that the carbon fiber woven fabric 2 was used as a reinforcing fiber fabric. In this Example, the running stability was "Good," and the fuzz prevention properties after 60-minute continuous running was also "Good".

Example 8

In the same manner as described in Example 7, the reinforcing fiber fabric was impregnated with the coating liquid A, subsequently introduced into the after-impregnation device 450, and subjected to inline after-impregnation with reference to the description of JP2011-132389A, except that the after-impregnation device 450 including the hot plates 451 and the heated nip rolls 452 was started up and used. The water absorption rate of the obtained prepreg due to the capillary action was checked and found to be 4% or less, which indicated a sufficient degree of impregnation as a prepreg. The water absorption rate was measured according to the method described in JP2016-510077 A. The prepreg was cut into 10 cm×10 cm, and one side thereof was immersed 5 mm deep in water for 5 minutes, and thus, the water absorption was calculated from the change in mass.

Example 9, and Reference Example 1

The prepregs obtained in Example 8 were laminated in six layers, and cured using an autoclave at 180° C. at 6 kgf/cm² (0.588 MPa) for two hours to obtain a CFRP (Example 9). The obtained CFRP had a tensile strength in the warp direction of 850 MPa, and had suitable mechanical properties as a structural material for the aerospace.

The carbon fiber woven fabric 2 and the coating liquid A which were used in Example 7 were used to produce a conventional prepreg by a conventional hot-melt process at a prepreg's running speed of 4 m/minute. The water absorption rate of this prepreg was found to be 4% or less, which indicated a sufficient degree of impregnation. This prepreg was cured using an autoclave at 180° C. at 6 kgf/cm² (0.588 MPa) for two hours to obtain a CFRP, which had a tensile strength in the warp direction of 840 MPa (Reference Example 1).

In this regard, the tensile strength of the CFRP was measured in the same manner as described in WO2011/118106, and the value resulting from normalizing the volume % of the reinforcing fibers in the prepreg to 53.8% was used.

Example 10

Reinforcing Fiber fabric: nonwoven polyester fabric having an areal weight of 12 g/m²
Matrix resin: A mixture of an alicyclic epoxy resin, a hydrogenated bisphenol A epoxy resin, acid anhydride hardener, triphenylphosphine, and silica particles
Prepreg production device: A prepreg production device as described in FIG. 21 (the depiction of a resin supply section is omitted).
Coating section: The coating section type 20c in the form depicted in FIG. 7, as in Example 1 (the liquid pool 22 was tapered in two tiers, the opening angle of the upper taper was 90° with a taper height (i.e., H) of 40 mm, and the opening angle of the lower taper was 60° with a taper height of 15 mm). In addition, a plate-like bush 27 conformed to the internal shape of the coating section was provided as a width regulation mechanism, as described in FIG. 5, and the width Y of the narrowed section 23 was the same as L2 (300 mm), which was 300 mm (L−W=0, L2−W=0). The gap D of the narrowed section 23 was 0.3 mm (the aspect ratio of the outlet slit was 1000). In addition, the space external to each bush was closed off at the bottom outlet of the narrowed section so that the coating liquid could not leak through the outlet of the narrowed section.

A 300 mm wide prepreg was produced using the above materials and devices at a running speed of 3 m/minute. In this Example, the after-impregnation device was not used.

In this Example, the continuous running property was "Good", the fuzz prevention properties (60 minutes) was "Good", the coating liquid application property (visual) was "Good", the impregnating property (visual) was "Good", and the edge deformation/folding was also "Good".

Example 11

Figure 22:
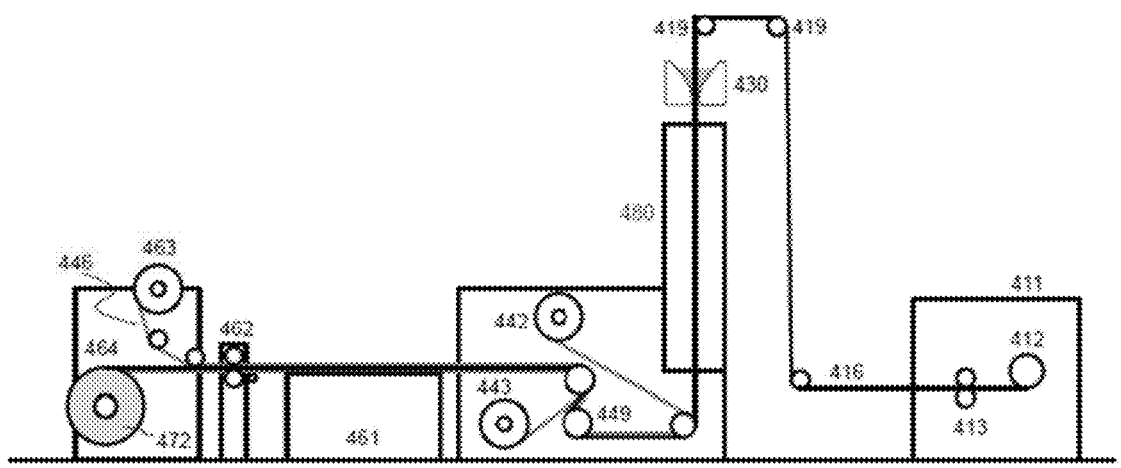
FIG. 22 is a schematic diagram of another process/device of producing a prepreg using the present invention.

Reinforcing Fiber fabric: woven fabric of glass fibers having an areal weight of 48 g/m²
Coating liquid: A matrix resin (a mixture of an alicyclic epoxy resin, a bisphenol A epoxy resin, solid rubber, novolac epoxy resin, dicyandimide, phenyldimethylurea, aluminum oxide, silica particles) to which MEK was added as a solvent.
Prepreg production device: A prepreg production device as described in FIG. 22 (the depiction of a resin supply section is omitted).
Coating section: The coating section type 20c in the form depicted in FIG. 7, as in Example 1 (the liquid pool 22 was tapered in two tiers, the opening angle of the upper taper was 90° with a taper height (i.e., H) of 40 mm, and the opening angle of the lower taper was 60° with a taper height of 15 mm). In addition, a plate-like bush 27 conformed to the internal shape of the coating section was provided as a width regulation mechanism, as described in FIG. 5, and the width Y of the narrowed section 23 was the same as L2 (300 mm), which was 300 mm (L−W=0, L2−W=0). The gap D of the narrowed section 23 was 0.3 mm unless otherwise specified (the aspect ratio of the outlet slit was 1000). In addition, the space external to each bush was closed off at the bottom outlet of the narrowed section so that the coating liquid could not leak through the outlet of the narrowed section.

A 300 mm wide prepreg was produced using the above materials and devices at a running speed of 3 m/minute.

In this Example, the continuous running property was "Good", the fuzz prevention properties (60 minutes) was "Good", the coating liquid application property (visual) was "Good", the impregnating property (visual) was "Good", and the edge deformation/folding was also "Good".

INDUSTRIAL APPLICABILITY

The coating liquid-impregnated reinforcing fiber fabric obtained by the production method according to the present invention can widely be applied as FRP typified by CFRP, in aerospace applications, applications for structural materials and interior materials such as for automobiles, trains, and ships, pressure vessels, industrial material applications, sports material applications, medical equipment applications, housing applications, civil engineering and construction applications, and the like.

REFERENCE SIGNS LIST

1a Reinforcing Fiber Fabric
1b Coating Liquid-Impregnated Reinforcing Fiber Fabric
2 Coating Liquid
3 Release Sheet
11 Supply Device
12 Nip Roll
13, 14 Conveyance Roll
15 Wind-up Device
16 Release Sheet Supply Device
20 Coating Section
20b Coating Section in another embodiment
20c Coating Section in another embodiment
20d Coating Section in another embodiment
20e Coating Section in another embodiment
21a, 21b Wall Constituent Members
21c, 21d Wall Constituent Members having another shape
21e, 21f Wall Constituent Members having another shape
21g, 21h Wall Constituent Members having another shape
21i, 21j Wall Constituent Members having another shape
22 Liquid Pool
22a Region whose cross-sectional area decreases continuously in Liquid Pool
22b Region whose cross-sectional area does not decrease in Liquid Pool
22c Region whose cross-sectional area decreases intermittently in Liquid Pool
23 Narrowed Section
24a, 24b Side Plate Members
25 Outlet
26 Gap
30 Coating Section in Comparative Example 1
31a, 31b Wall Constituent Members in Comparative Example 1

32 Liquid Pool in Comparative Example 1
33 Region whose cross-sectional area decreases intermittently in Liquid Pool in Comparative Example 1
35a, 35b, 35c Bars
100 Coating Device
B Depth of Liquid Pool 22
C Height up to the liquid surface at the top of Liquid Pool 22
D Gap of Narrowed Section
G Position at which width regulation is carried out
H Vertical Height along which the cross-sectional area of Liquid Pool 22 decreases continuously
L Width of Liquid Pool 22
L2 Width regulated by Width Regulation Mechanism at the lower end of Width
Regulation Mechanism
R, Ra, Rb Circular Stream in the Edge
T Circular Streams
W Width of Coating Liquid-Impregnated Reinforcing Fiber Fabric 1b, as measured immediately under Narrowed Section 23
Y Width of Narrowed Section 23
Z Running Direction (Vertically Downward Direction) of Reinforcing Fiber Fabric 1a
θ Opening Angle of Tapered Portion
411 Creel
412 Reinforcing Fiber Fabric Roll
413 Nip Roll
416 Reinforcing Fiber Fabric
418 Smoothing Device
419 Diverting Roll
420 Reinforcing Fiber Preheating Device
430 Coating Section
431 First Coating Section
432 Second Coating Section
441 Diverting Roll
442 Release Sheet (Upper side) Supply Device
443 Release Sheet (Lower side) Supply Device
444 High Tension Take-up Device
445 Diverting Roll
446 Release Sheet
447 Lamination Roll
448 High Tension Take-up Device
449 High Tension Take-up S-shaped Arranged Roll
450 After-impregnation Device
451 Hot Plate
452 Heated Nip Roll
453 Simplified After-impregnation Device
454 Heated Nip Roll
455 Heated S-shaped Arranged Rolls
456 Contact Roll
461 Cooling Device
462 Take-up Device
463 Release Sheet (Upper side) Wind-up Device
464 Winder
471 Prepreg (Coating Liquid-Impregnated Reinforcing Fiber Fabric)
472 Prepreg/Release Sheet (Sheet-like Integrated Object)
480 Dry Chamber

The invention claimed is:

1. A method of producing a coating liquid-impregnated sheet-shaped reinforcing fiber fabric, comprising:
allowing a sheet-shaped reinforcing fiber fabric to pass substantially vertically downward through the inside of a coating section storing a coating liquid to provide said reinforcing fiber fabric with said coating liquid;
wherein said coating section includes a liquid pool and a narrowed section which are in communication with each other;
wherein said liquid pool has a portion whose cross-sectional area decreases continuously along a running direction of said reinforcing fiber fabric;
wherein said narrowed section has a slit-shaped cross-section and has a smaller cross-sectional area than the top side of said liquid pool;
wherein the vertical height of said portion whose cross-sectional area decreases continuously in said liquid pool is 10 mm or more, and
wherein said coating section further comprises, in said liquid pool, a width regulation mechanism for regulating the width of said reinforcing fiber fabric, wherein the relationship between the width (W) of said reinforcing fiber fabric immediately under said narrowed section and the width (L2) regulated by said width regulation mechanism at the lower end of said width regulation mechanism satisfies L2≤W+10 (mm).

2. The method of producing a coating liquid-impregnated sheet-shaped reinforcing fiber fabric according to claim 1, wherein said width regulation mechanism is provided over the whole region of said liquid pool and said narrowed section.

3. The method of producing a coating liquid-impregnated sheet-shaped reinforcing fiber fabric according to claim 1, wherein the viscosity of said coating liquid is 1 to 60 Pa·s as measured at a strain rate of 3.14 s$^{-1}$ at a coating liquid temperature in said liquid pool.

4. The method of producing a coating liquid-impregnated sheet-shaped reinforcing fiber fabric according to claim 1, wherein said coating liquid contains a thermosetting resin.

5. The method of producing a coating liquid-impregnated sheet-shaped reinforcing fiber fabric according to claim 1, comprising:
using a coating liquid containing polymer particles; and
providing said reinforcing fiber fabric with said coating liquid,
wherein the temperature of said coating liquid in said coating section is 20° C. or more lower than the glass transition temperature (Tg) or melting point (Tm) of a resin constituting said polymer particles.

6. The method of producing a coating liquid-impregnated sheet-shaped reinforcing fiber fabric according to claim 1, wherein said reinforcing fiber fabric is heated and then introduced into said liquid pool.

7. A method of producing a sheet-shaped integrated object, comprising:
obtaining a coating liquid-impregnated sheet-shaped reinforcing fiber fabric by said method of producing a coating liquid-impregnated reinforcing fiber fabric according to claim 1;
providing at least one side of the obtained coating liquid-impregnated reinforcing fiber fabric with a release sheet to form a sheet-shaped integrated object; and
taking up said sheet-shaped integrated object.

8. The method of producing a sheet-shaped integrated object according to claim 7, wherein said sheet-shaped integrated object is formed and then subjected to after-impregnation.

9. The method of producing a sheet-shaped integrated object according to claim 7, wherein said sheet-shaped integrated object is a prepreg.

10. A method of producing a prepreg tape, comprising:
obtaining a prepreg by said method of producing a sheet-shaped integrated object according to claim 9; and
slitting said prepreg.

11. A method of producing a fiber reinforced composite material, comprising:
obtaining a prepreg by said method of producing a sheet-shaped integrated object according to claim 9; and
curing said prepreg.

12. A method of producing a fiber reinforced composite material, comprising:
obtaining a prepreg tape by said method of producing a prepreg tape according to claim 10; and
curing said prepreg tape.

* * * * *